(12) United States Patent
Nakanouchi et al.

(10) Patent No.: US 9,028,988 B2
(45) Date of Patent: May 12, 2015

(54) BATTERY PACK, ELECTRICITY STORAGE SYSTEM, ELECTRONIC APPARATUS, ELECTRICALLY DRIVEN VEHICLE, ELECTRIC POWER SYSTEM, AND CONTROL SYSTEM

(75) Inventors: Atsushi Nakanouchi, Fukushima (JP); Masaki Hogari, Fukushima (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 13/368,067

(22) Filed: Feb. 7, 2012

(65) Prior Publication Data

US 2012/0225328 A1 Sep. 6, 2012

(30) Foreign Application Priority Data

Mar. 1, 2011 (JP) .................................. 2011-044281

(51) Int. Cl.
*H01M 2/00* (2006.01)
*B60L 11/18* (2006.01)
*B60L 11/00* (2006.01)
(Continued)

(52) U.S. Cl.
CPC ........... *B60L 11/1864* (2013.01); *B60L 11/007* (2013.01); *B60L 11/126* (2013.01); *B60L 11/1816* (2013.01); *B60L 11/1846* (2013.01); *B60L 2200/12* (2013.01); *B60L 2210/30* (2013.01); *B60L 2210/40* (2013.01); *B60L 2230/16* (2013.01); *B60L 2230/22* (2013.01); *B60L 2230/24* (2013.01); *B60L 2230/28* (2013.01); *B60L 2230/30* (2013.01); *B60L 2240/12* (2013.01); *B60L 2240/14* (2013.01); *B60L 2240/441* (2013.01); *B60L 2240/545* (2013.01); *B60L 2250/16* (2013.01); *H01M 10/425* (2013.01); *H01M 10/48* (2013.01); *H01M 10/486* (2013.01); *H01M 2220/10* (2013.01); *H01M 2220/20* (2013.01); *H01M 2220/30* (2013.01); *Y02T 10/7077* (2013.01); *Y02T 10/7005* (2013.01); *Y02T 10/7241* (2013.01); *Y02T 10/7094* (2013.01); *Y02T 10/7061* (2013.01); *Y02T 90/163* (2013.01); *Y02T 90/169* (2013.01); *Y02T 90/121* (2013.01); *Y02T 90/14* (2013.01); *Y02T 90/128* (2013.01);
(Continued)

(58) Field of Classification Search
None
See application file for complete search history.

(56) References Cited

U.S. PATENT DOCUMENTS

2005/0174211 A1* 8/2005 Takeda .......................... 337/377
2007/0272525 A1 11/2007 Suzuki
(Continued)

FOREIGN PATENT DOCUMENTS

JP 05-146094 6/1993
JP 07-153499 6/1995
(Continued)

OTHER PUBLICATIONS

Japanese Office Action issued Sep. 30, 2014 in corresponding Japanese Application No. 2011044281.

*Primary Examiner* — Patrick Ryan
*Assistant Examiner* — Wyatt McConnell
(74) *Attorney, Agent, or Firm* — K&L Gates LLP

(57) ABSTRACT

There is provided a battery pack including a current control element which is inserted in a discharge current path, and in which a thermostat and a heat sensitive resistance element whose resistance value increases in response to an increase in temperature are connected in parallel; and a detection unit that outputs an open signal indicating the opening of the contacts when it is detected that contacts of the thermostat are opened.

16 Claims, 19 Drawing Sheets

(51) Int. Cl.
  *B60L 11/12* (2006.01)
  *H01M 10/42* (2006.01)
  *H01M 10/48* (2006.01)

(52) U.S. Cl.
  CPC ............... *Y02T 90/127* (2013.01); *Y04S 30/14* (2013.01); *Y02T 10/6217* (2013.01)

(56) References Cited

U.S. PATENT DOCUMENTS

2010/0085010 A1* 4/2010 Suzuki et al. ............... 320/132
2010/0091815 A1* 4/2010 Nakazato et al. ............ 374/152
2010/0092819 A1* 4/2010 Umayahara et al. ........... 429/22
2013/0164589 A1* 6/2013 Ota et al. ...................... 429/99

FOREIGN PATENT DOCUMENTS

| | | |
|---|---|---|
| JP | 09-046893 | 2/1997 |
| JP | 2004-014434 | 1/2004 |
| JP | 2004-288536 | 10/2004 |
| JP | 2005-124329 | 5/2005 |
| JP | 2005-222834 | 8/2005 |
| JP | 2007-149350 | 6/2007 |
| JP | 2008-236877 | 10/2008 |
| JP | 2009-264779 | 11/2009 |
| JP | 2010-041819 | 2/2010 |
| JP | 2010-093953 | 4/2010 |
| JP | 2010-252566 | 11/2010 |
| JP | 2011-041380 | 2/2011 |

* cited by examiner

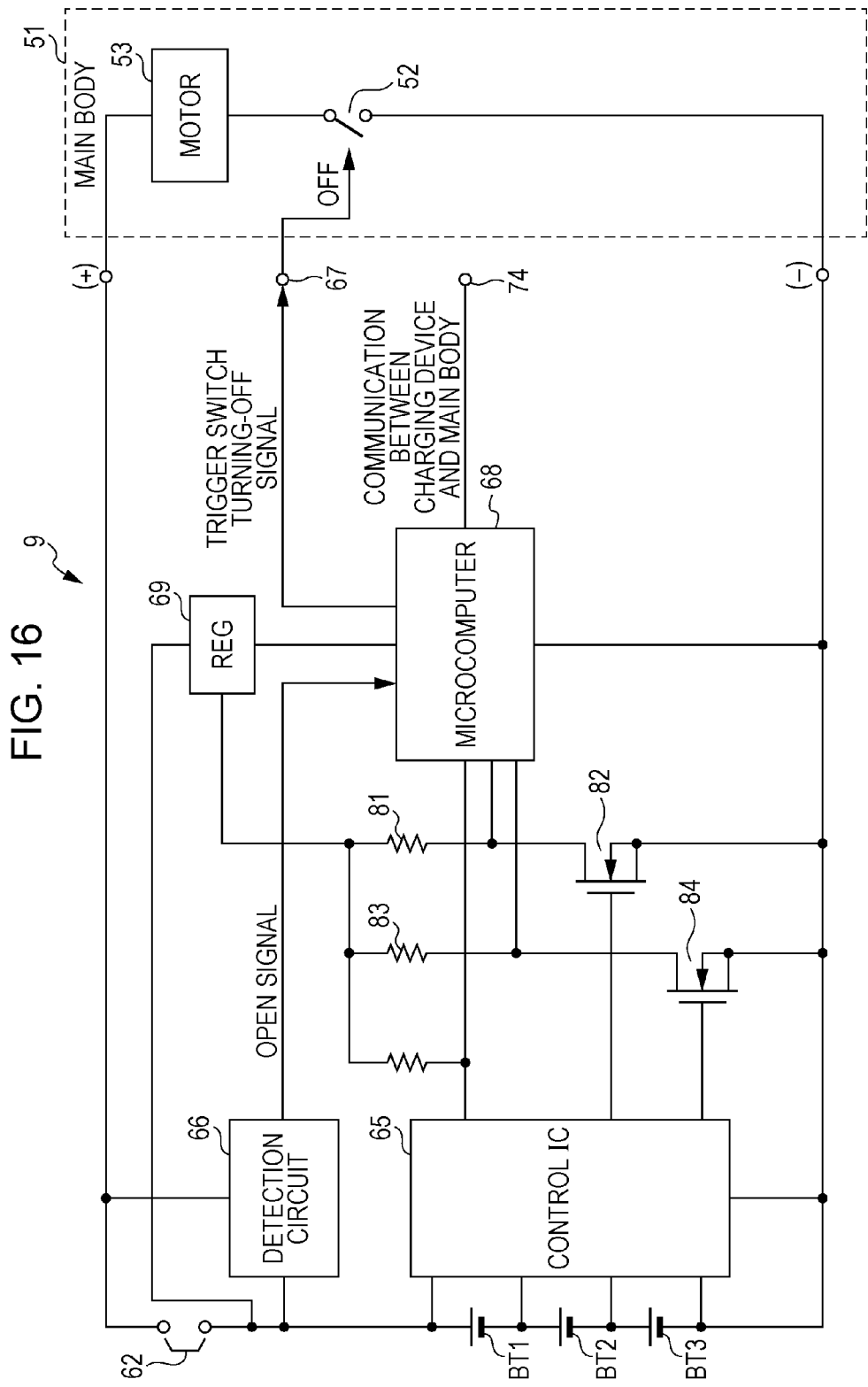

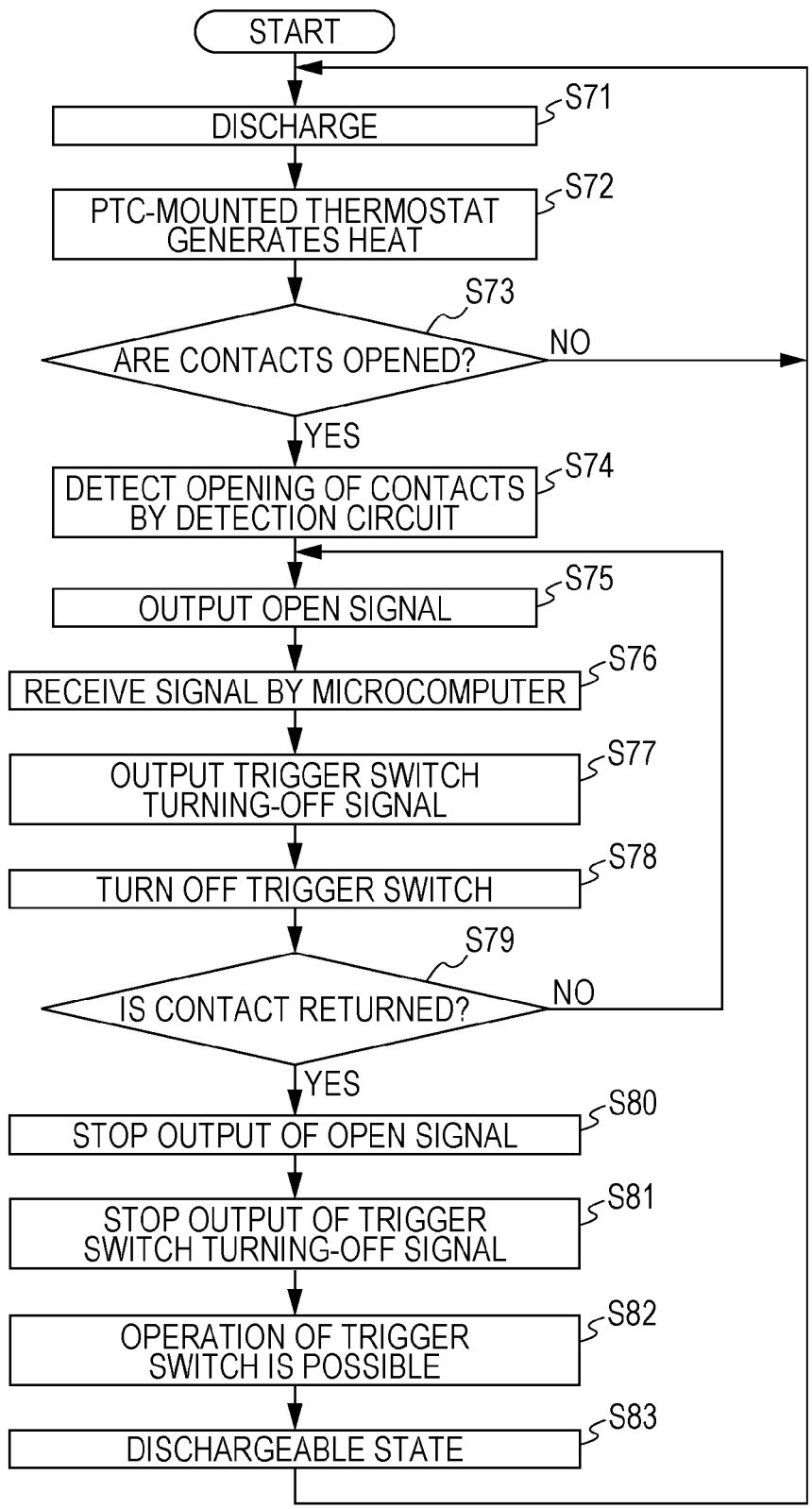

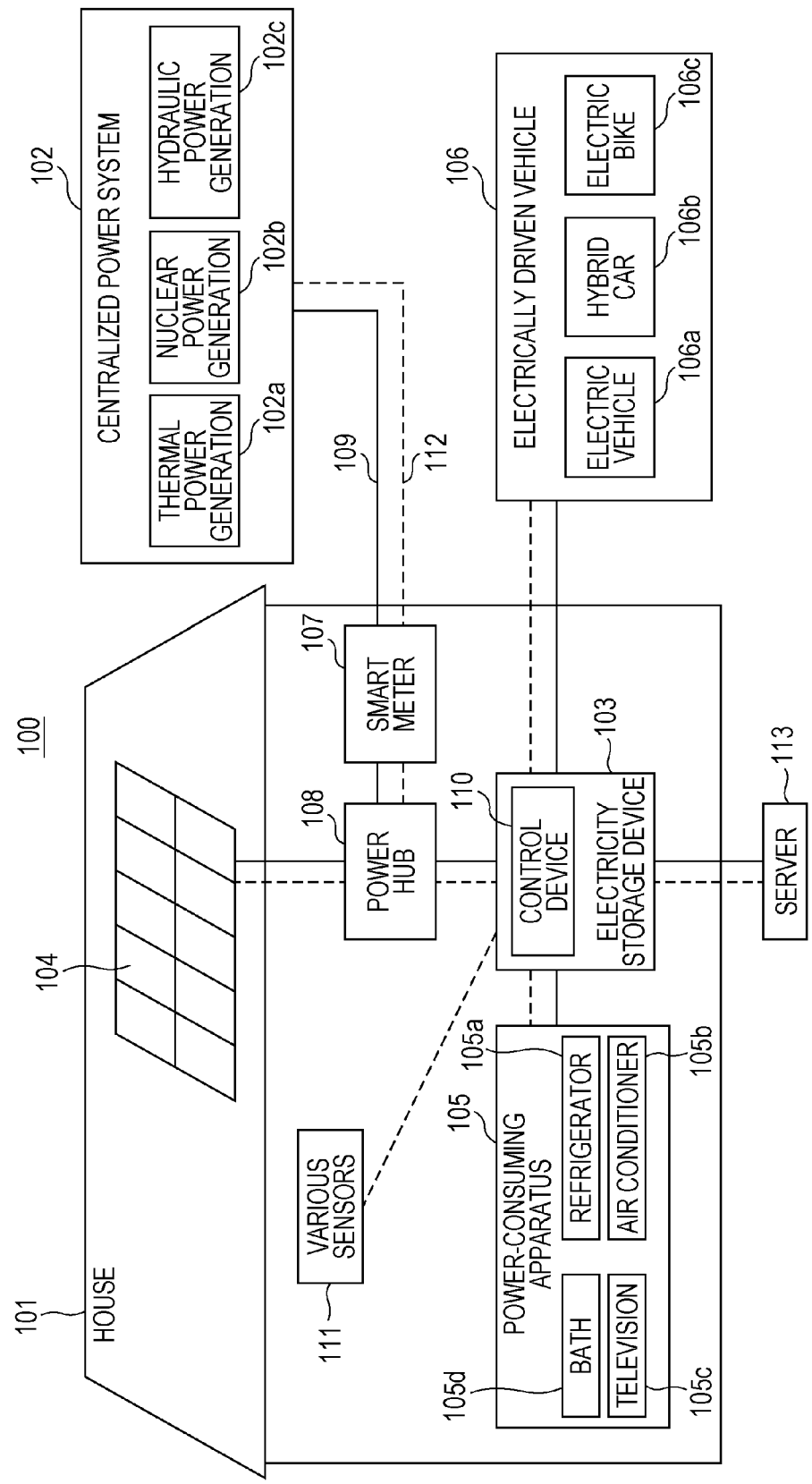

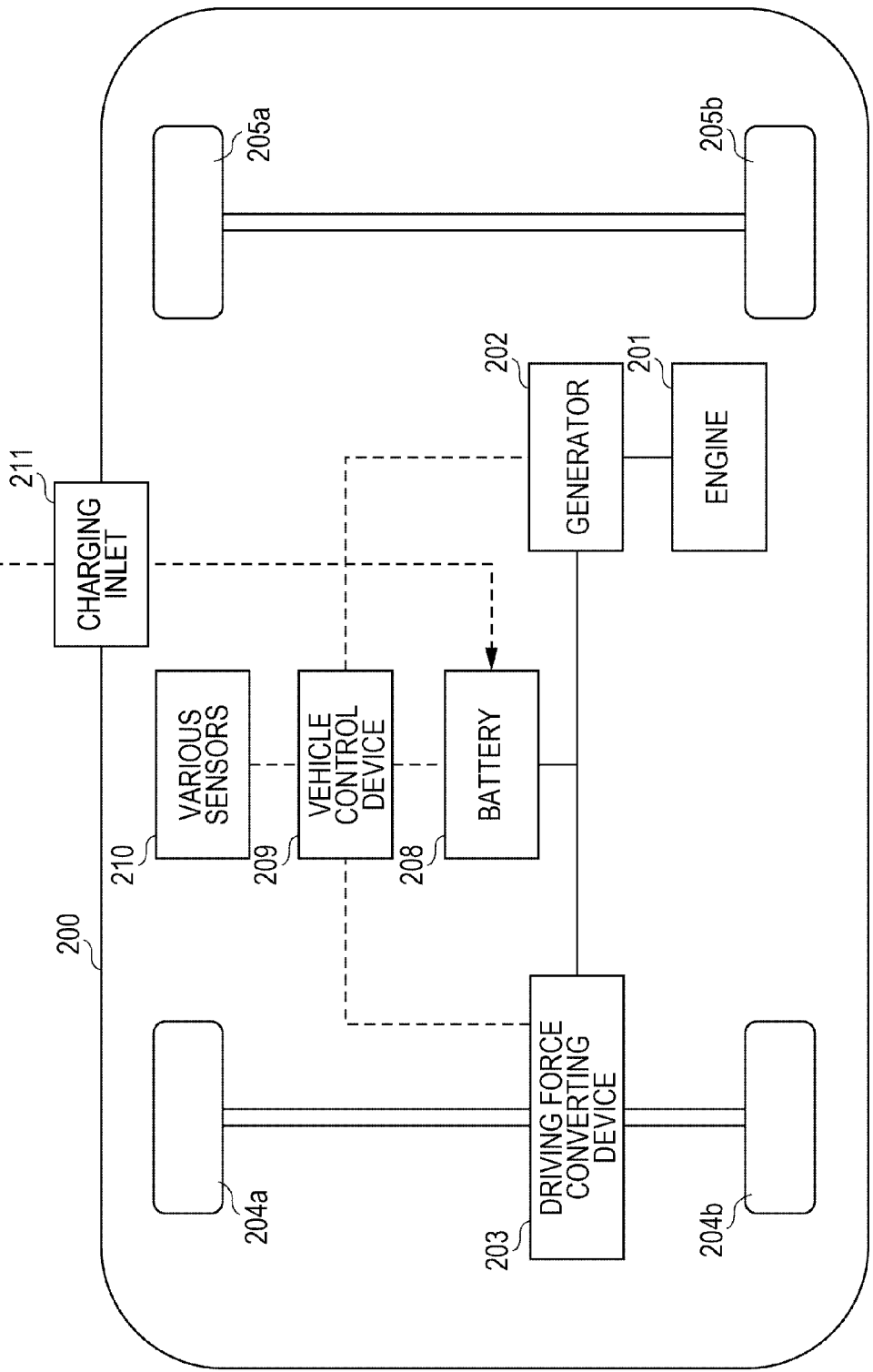

BATTERY PACK, ELECTRICITY STORAGE SYSTEM, ELECTRONIC APPARATUS, ELECTRICALLY DRIVEN VEHICLE, ELECTRIC POWER SYSTEM, AND CONTROL SYSTEM

CROSS REFERENCES TO RELATED APPLICATIONS

The present application claims priority to Japanese Priority Patent Application JP 2011-044281 filed in the Japan Patent Office on Mar. 1, 2011, the entire content of which is hereby incorporated by reference.

BACKGROUND

The present disclosure relates to a battery pack that is applicable to an electric tool such as an electric drill and an electric screwdriver, and an electricity storage system, an electronic apparatus, an electrically driven vehicle, an electric power system, and a control system to which the battery back is applicable.

As a power supply (secondary battery) of an electric tool, a lithium ion battery (hereinafter, appropriately referred as a "lithium ion battery") utilizing doping and de-doping of lithium ions is used. The lithium ion battery includes a positive electrode in which a positive active material layer using a lithium composite oxide such as $LiCoO_2$ and $LiNiO_2$ is formed on a positive electrode current collector, and a negative electrode in which a negative active material layer using a carbon-based material such as graphite and a non-graphitized carbon material, which can dope or de-dope lithium, is formed on a negative electrode current collector. The positive electrode and the negative electrode are laminated with a separator interposed therebetween, and are bent or wound to form a battery device. This battery device is accommodated in, for example, a metal tube or a laminated film together with a nonaqueous electrolytic solution that is obtained by dissolving a lithium salt in an aprotic organic solvent to form a battery.

A protection circuit is necessary to prevent an overcharge, an overdischarge, or an overcurrent in the lithium ion battery. In the case of an electric tool, a relatively large current flows, such that a protective element with a high current capacity is necessary. As the protective element, for example, a FET (Field Effective Transistor) or a fuse is used. In addition, a technology in which a breaker is used for protection from an overcurrent, or a technology described in Japanese Unexamined Patent Application Publication No. 2005-222834 is suggested. In Japanese Unexamined Patent Application Publication No. 2005-222834, a switch having an overcurrent protection function in which a mechanical switch and a heat sensitive resistance element (Positive Temperature Coefficient: PTC element, also called PTC thermistor) are combined is described. The PTC element has a characteristic in that a resistance thereof is low at a relatively low temperature, but the resistance increases rapidly when exceeding an arbitrary temperature.

A size of the protective element such as the FET or the fuse becomes large in the case of a high current capacity, such that there is a problem in that the cost thereof increases. Furthermore, the fuse has a characteristic in that recovery is difficult, such that when the fuse is fused for the prevention of the overcurrent, the battery is protected, but reuse thereof may be difficult. In regard to the breaker, after the breaker operates once, it is necessary for a user to manually reset the breaker. As a reusable element, a self-reset type element in which a contact returns after passage of a predetermined time from the prevention of the overcurrent and thereby discharging becomes possible is disclosed. Even in the case of using the self-reset type element, it is preferable that a safety mechanism other than the self-reset type element be constructed for securing safety of the lithium ion battery.

In addition, in the related art, it is difficult for a user to recognize a timing, at which the contact of the self-reset type element returns and thereby the discharging becomes possible, from the outside. Therefore, there is a concern that while a user is confirming the status of an electric tool in which an operation thereof has stopped at once due to the overcurrent, the contact may be returned and the electric tool may operate again.

SUMMARY

Therefore, it is desirable to improve safety of a battery pack in which a self-reset type element is used, and safety of an apparatus in which the battery pack is used.

According to an embodiment of the present disclosure, there is provided a battery pack including a current control element which is inserted in a discharge current path of a battery cell, and in which a thermostat and a heat sensitive resistance element whose resistance value increases in response to an increase in temperature are connected in parallel; and a detection unit that outputs an open signal indicating the opening of the contacts when it is detected that contacts of the thermostat are opened.

According to another embodiment of the present disclosure, there is provided a battery pack including a current control element which is inserted in a discharge current path of a battery cell, and in which a thermostat and a heat sensitive resistance element whose resistance value increases in response to an increase in temperature are connected in parallel; a detection unit that outputs an open signal indicating the opening of the contacts when it is detected that contacts of the thermostat are opened; a control unit that performs a control for realizing a discharge prohibition state when the open signal is supplied; and a maintaining unit that maintains the discharge prohibition state, wherein in a case where the opened contact returns, the maintaining unit is controlled by the control unit to maintain the discharge prohibition state.

According to still another embodiment of the present disclosure, there is provided an electricity storage system in which the above-described battery pack is charged by a power generator that generates electricity from renewable energy.

According to still embodiment of the present disclosure, there is provided an electricity storage system that includes the above-described battery pack and that supplies an electric power to an electronic apparatus connected to the battery pack.

According to still another embodiment of the present disclosure, there is provided an electronic apparatus in which electric power is supplied from the above-described battery pack.

According to still another embodiment of the present disclosure, there is provided an electrically driven vehicle including a converting device to which electric power is supplied from the above-described battery pack, and which converts the electric power to a driving force of a vehicle; and a control device that performs an information processing related to a vehicle control based on information related to the battery pack.

According to still another embodiment of the present disclosure, there is provided an electric power system including an electric power information transmitting and receiving unit that transmits and receives signals to and from another apparatus through a network, wherein a charging and discharging control of the above-described battery pack is performed based on the information which the power information transmitting and receiving unit receives.

According to still another embodiment of the present disclosure, there is provided an electric power system in which electric power is supplied from the above-described battery pack, or electric power is supplied to the battery pack from a power generator, or an electric power network.

According to still another embodiment of the present disclosure, there is provided a control system including an external apparatus; and a battery pack that is mounted in the external apparatus, wherein the battery pack includes a current control element which is inserted in a discharge current path of a battery cell, and in which a thermostat and a heat sensitive resistance element whose resistance value increases in response to an increase in temperature are connected in parallel, a terminal that is connected to the external apparatus, and a detection unit that outputs an open signal indicating the opening of the contacts through the terminal when it is detected that contacts of the thermostat are opened, and the external apparatus includes a switching element that is turned off according to the open signal.

According to still another embodiment of the present disclosure, there is provided a control system including an external apparatus; and a battery pack that is mounted in the external apparatus, wherein the battery pack includes a current control element which is inserted in a discharge current path of a battery cell, and in which a thermostat and a heat sensitive resistance element whose resistance value increases in response to an increase in temperature are connected in parallel, a detection unit that outputs an open signal indicating the opening of the contacts when it is detected that contacts of the thermostat are opened, a control unit that performs a control for realizing a discharge prohibition state when the open signal is supplied, and controls the external apparatus to be an operation prohibition state, and a maintaining unit that maintains the discharge prohibition state and the operation prohibition state, and wherein in a case where the opened contact returns, the maintaining unit is controlled by the control unit to maintain the discharge prohibition state and the operation prohibition state.

According to at least one of embodiment of the present disclosure, safety of a battery pack is improved.

Additional features and advantages are described herein, and will be apparent from the following Detailed Description and the figures.

BRIEF DESCRIPTION OF THE FIGURES

FIG. 16 is a connection diagram of a battery pack according to a ninth embodiment of the present disclosure;

FIG. 17 is a flow chart illustrating an operation of the battery pack according to the ninth embodiment of the present disclosure;

FIG. 18 is a schematic diagram illustrating an application of a battery pack; and FIG. 19 is a schematic diagram illustrating another application of the battery pack.

DETAILED DESCRIPTION

Figure 1A:
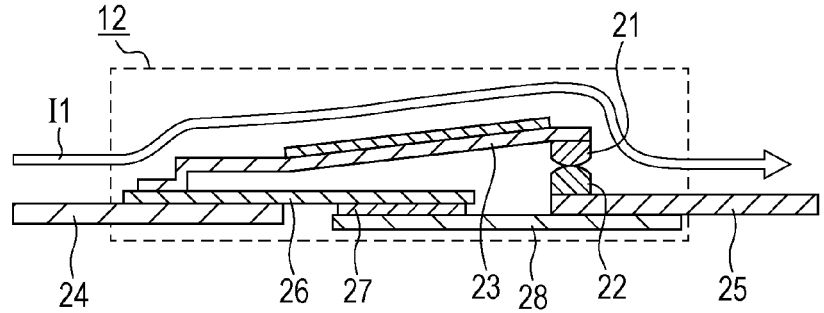
FIGS. 1A to 1D are schematic diagrams that are used for illustrating a PTC-mounted thermostat according to an embodiment of the present disclosure.

Hereinafter, a plurality of embodiments, applications, and modifications will be described with reference to attached drawings. In addition, embodiments or the like described below are preferred specific examples, and various limitations that are technically preferable are put, but in the following description, the present disclosure is not limited to these embodiments as long as description for the purpose of an explicit limitation is not made. The description will be made in the following order.

With Respect to PTC-Mounted Thermostat
First Embodiment
Second Embodiment
Third Embodiment
Fourth Embodiment
Fifth Embodiment
Sixth Embodiment
Seventh Embodiment
Eighth Embodiment
Ninth Embodiment
Application
Modification With Respect to PTC-Mounted Thermostat The inventors of the present disclosure previously suggested a technology related to a PTC-mounted thermostat, which is an example of a self-reset type element, in Japanese Patent Application No. 2009-229915. The present disclosure contains the contents of the application. Hereinafter, for the easy understanding of the present disclosure, the PTC-mounted thermostat will be described.

Configuration of PTC-Mounted Thermostat

The PTC-mounted thermostat 12 has, for example, a rod-shaped appearance with a trapezoid cross-section. As shown in FIGS. 1A to 1D, the PTC-mounted thermostat 12 includes a movable contact 21 and a fixed contact 22. The movable contact 21 is fixed to a movable end of a bimetal 23. A fixed end of the bimetal 23 is fixed to an input terminal 24. The bimetal 23 is formed by bonding two metallic sheets in which thermal coefficients are different from each other, and bends as the temperature increases. The fixed contact 22 is fixed to an output terminal 25. A configuration of a switch in which the contacts 21 and 22 come into contact with each other or are separated from each other by the bimetal 23 is called a thermostat.

A PTC element 27 as a heat sensitive resistance element is interposed between a conductive supporting plate 26 connected to the input terminal 24 and a conductive supporting plate 28 connected to the output terminal 25. That is, between the input terminal 24 and the output terminal 25, a current path passing through the thermostat including the bimetal 23 and a current path passing through the PTC element 27 are connected in parallel. The PTC-mounted thermostat 12 is inserted into, for example, a discharge current path of a current cell in a battery pack.

Operation of PTC-Mounted Thermostat

An operation of the PTC-mounted thermostat 12 will be described. At a common discharge state (or a common charge state), resistance of the bimetal 23 is sufficiently lower than that of the PTC element 27, such that a current flows through the bimetal 23. As shown in FIG. 1A, when an overcurrent I1 flows with respect to the PTC-mounted thermostat 12 due to locking of a motor, or the like, the bimetal 23 generates heat due to the overcurrent I1.

Figure 1B:
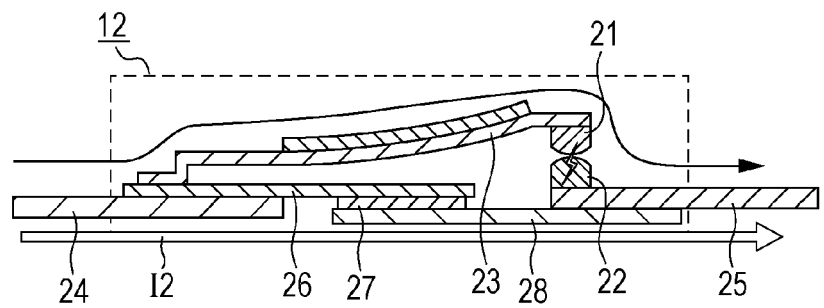

As shown in FIG. 1B, the bimetal 23 bends due to the heat generation and the movable contact 21 and the fixed contact 22 start to be separated from each other. When an overcurrent flows in this state, an arc discharge may occur between the contacts 21 and 22, the contacts 21 and 22 may be welded to each other. However, when the contacts start to be opened, the majority component 12 of the overcurrent bypasses through the PTC element 27 having relatively low resistance, such that the arc discharge is suppressed.

Figure 1C:
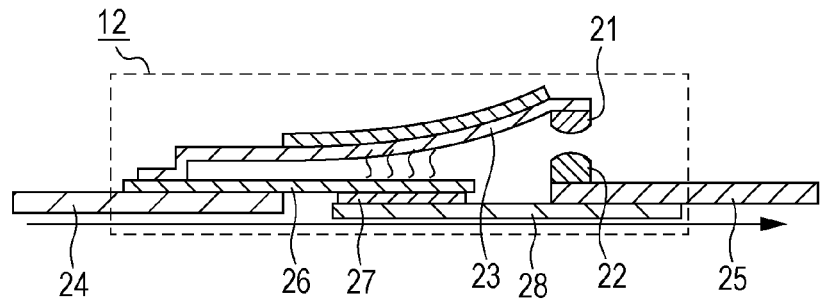

As shown in FIG. 1C, when the contacts are completely opened due to the bending of the bimetal 23, the PTC element 27 generates heat due to the overcurrent I2, and thereby the resistance of the PTC element 27 increases. As a result, a current that flows through the PTC element 27 is restricted or interrupted. Commonly, a small leakage current flows through the PTC element 27. As long as the overcurrent flows, the PTC element 27 keeps high resistance, and the bimetal 23 keeps the bent state due to heat generated in the PTC element 27. When the PTC element 27 is not provided, there is a concern in that the opening and connection are repeated according to a change in temperature, and chattering may occur.

Figure 1D:
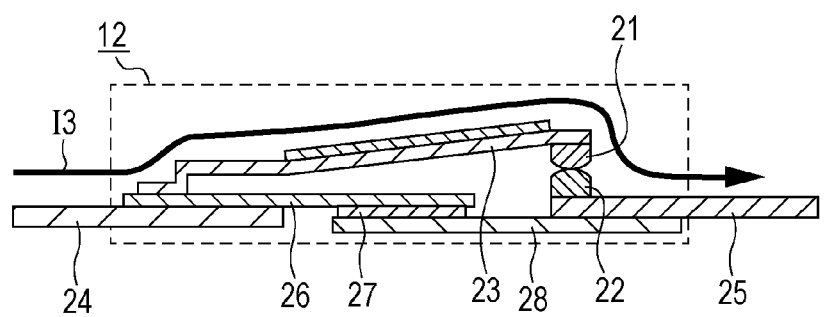

When the overcurrent disappears and thereby it becomes a state in which a normal current I3 flows as shown in FIG. 1D, the heat of the PTC element 27 is lowered, such that the resistance value of the PTC element 27 becomes small. As a result, the bending of the bimetal 23 disappears, and therefore the contacts 21 and 22 come into contact with each other. The normal current I3 flows through the bimetal 23 having a sufficiently small resistance value. In this manner, the overcurrent may be interrupted and it may also return to a common state.

Optimization of PTC-Mounted Thermostat

In a case where a quantity of heat that is defined by a product of a current value of the overcurrent and a flowing time is large, a lead electrode of a battery cell, a separator, or the like is damaged. A characteristic of the PTC-mounted thermostat 12 that restricts the overcurrent so as not to cause damage to a battery cell BT may be determined through a measurement result obtained by using a plurality of samples of a battery cell that is actually used. That is, a plurality of samples of the battery cell is prepared, and a discharge current value and a discharge time with respect to respective samples are changed, and then an investigation is made into whether or not the battery cell is damaged. Preferably, the damage may be investigated after performing a plurality of times of discharge.

Figure 2:
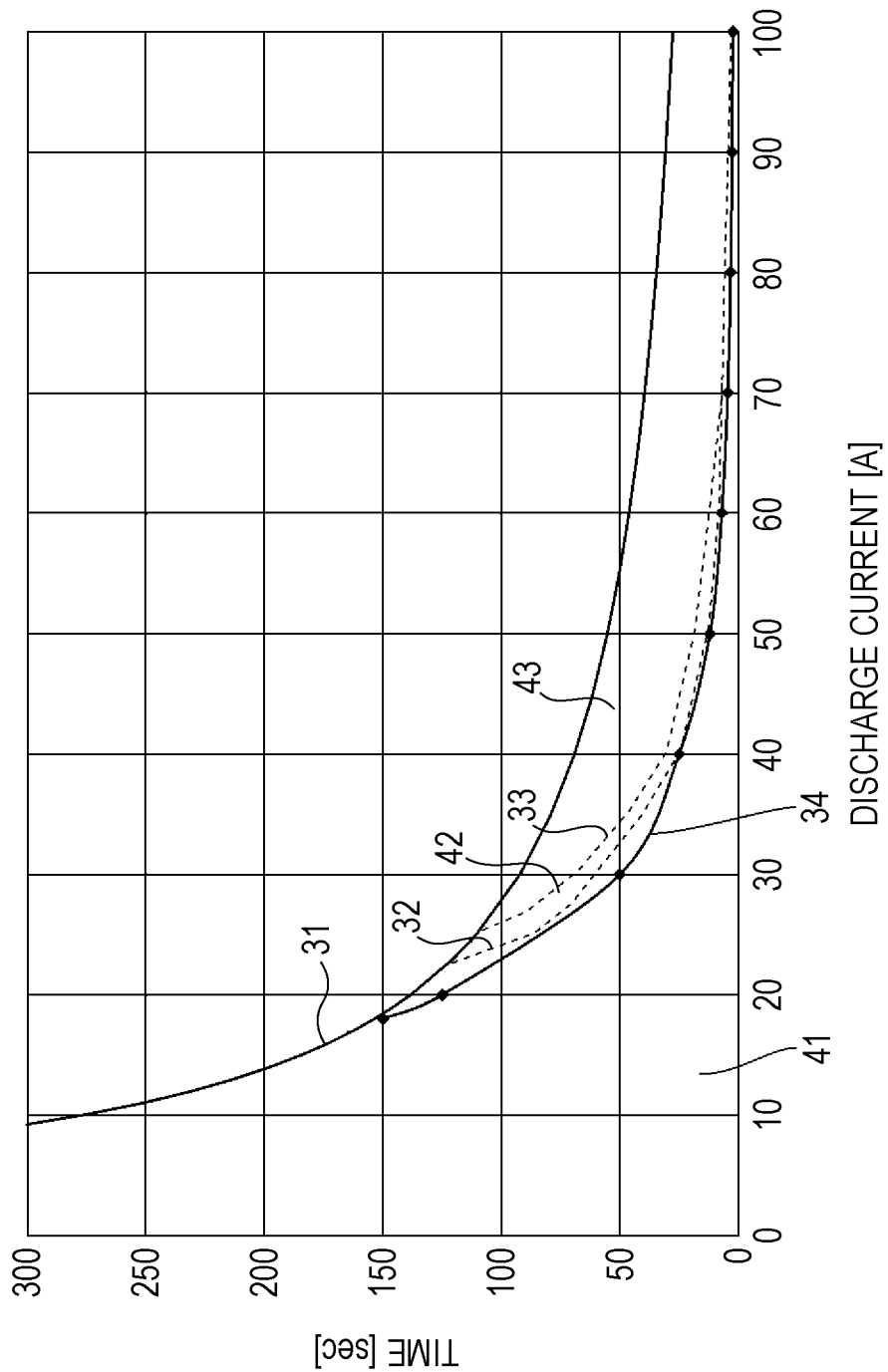
FIG. 2 is a schematic diagram illustrating an example of a characteristic of the PTC-mounted thermostat according to the embodiment of the present disclosure.

FIG. 2 shows an example of an overload damage map, which is obtained from the above-described measurement result, of a lithium ion secondary battery (for example, a cylindrical type). The horizontal axis represents a discharge current (A), and the vertical axis represents a discharge time (second). A curved line 31 represents a discharge rate of 100%. A region 41 that is located at an inner side of a broken curved line 32 is a damage-free region. A region 42 interposed between the curved line 32 and a broken curved line 33 is a region in which there is a possibility of the battery cell being damaged. For example, this region is a contraction region of a separator, in which the contraction of the separator of the battery cell occurs. A region 43 interposed between the curved line 33 and the curved line 31 is a region in which the battery cell is damaged. For example, this region is a separator melting region in which the melting of the separator of the battery cell occurs.

As described above, the PTC-mounted thermostat 12 restricts the overcurrent through the bending of the bimetal 23 (separation of the contacts), and the change of the resistance value of the PTC element 27 into a high value. That is, there is present an interruption period from a timing at which the overcurrent starts to flow to a timing at which the interruption is made to a degree to which the overcurrent does not come into effect. In consideration of variation in measurement, an interruption period characteristic of the PTC-mounted thermostat 12 is set in such a manner that a discharge current vs. a discharge time characteristic indicated by a curved line 34 drawn at a slightly lower side than the curved line 32 in FIG. 2 is realized. The curved line 32 defines a boundary between the damage-free region 41 and the separator contraction region 42, such that it is possible to prevent the occurrence of damage to the battery cell due to the characteristic of the curved line 34. The setting of the interruption period characteristic of the PTC-mounted thermostat 12 in this manner is realized through the setting of a characteristic defined by a thickness of the bimetal 23, or the like, and the setting of a characteristic of the PTC element 27, or the like.

When the PTC-mounted thermostat is assembled in the battery pack as a protective circuit, it is possible to stop the overcurrent before damage inside the pack occurs. In addition, after the overcurrent disappears, it is possible recover a common operation.

The battery pack in which the PTC-mounted thermostat is assembled is used as a power supply of an electric tool such as an electric circular saw. When wood, a vinyl chloride pipe, an aluminum pipe, or the like is cut using the electric circular saw, a load current increases. At this time, when a user uses the electric circular saw by inserting the saw forcedly, a blade of the electric circular saw is bitten by an object to be cut and thereby a motor is locked. When the motor is locked, the overcurrent flows.

The PTC-mounted thermostat operates according to the flowing of the overcurrent, and thereby the electric circular saw is stopped. At this time, the user may consider that abnormality occurs in the electric circular saw, and there is a possibility of the user confirming a state of the electric circular saw or pushing a trigger switch of the electric circular saw several times, or the like. During these operations, it is not preferable that one of the contacts of the PTC-mounted thermostat returns, and the electric circular saw operates suddenly. Therefore, it is preferable that the user can recognize the timing at which the contact of the PTC-mounted thermostat returns.

In consideration of the above-described situations, the present disclosure modifies the PTC-mounted thermostat, and thereby improves safety of the battery pack, the electric tool in which the battery pack is used, or the like. Hereinafter, the present disclosure will be described in detail with reference to a plurality of embodiments.

First Embodiment

Example of Electric Tool

Figure 3:
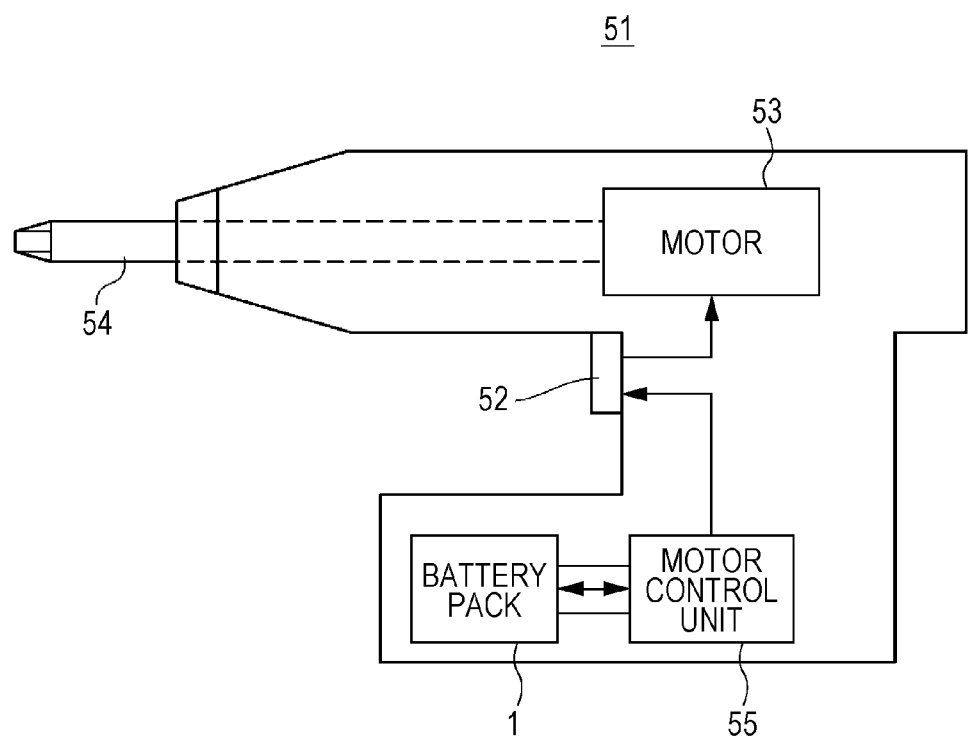
FIG. 3 is a block diagram illustrating a schematic configuration of an electric screwdriver to which the embodiment of the present disclosure is applicable.

An example of an electric tool that is applicable to the present disclosure, for example, an electric screwdriver will be schematically described with reference to FIG. 3. In an electric screwdriver 51, a motor 53 such as a DC motor is accommodated in a main body. A rotation of the motor 53 is transferred to a shaft 54, and a screw is put into a subject by the shaft 54. The electric screwdriver 51 is provided with a trigger switch 52 which a user operates.

A battery pack 1 and a motor control unit 55 described later are accommodated in a lower casing of a handle of the electric screwdriver 51. The motor control unit 55 controls the motor 53. Each portion of the electric screwdriver 51 other than the motor 53 may be controlled by the motor control unit 55. Although not shown, the battery pack 1 and the electric screwdriver 51 engage with engagement members provided respectively. As described later, the battery pack 1 and the motor control unit 55 are provided with a microcomputer, respectively. Battery power is supplied with respect to the motor control unit 55 from the battery pack 1, and information of the battery pack 1 is communicated between the microcomputers of both of these.

The battery pack 1 is detachable with respect to, for example, the electric screwdriver 51. The battery pack 1 may be embedded in the electric screwdriver 51. The battery pack 1 is mounted in a charging device during being charged. In addition, when the battery pack 1 is mounted in the electric screwdriver 51, a part of the battery pack 1 may be exposed to the outside of the electric screwdriver 51 so as to be visible to a user. For example, the exposed part of the battery pack 1 may be provided with a LED described later in order for the user to visually recognize light emission or turning-off of the LED. For example, battery packs 2, 3, . . . , 9 that are described later are mounted in the electric screwdriver 51.

The motor control unit 55 controls, for example, rotation and stop, and a rotational direction of the motor 53. Furthermore, the motor control unit 55 interrupts power supply to a load during overdischarging. For example, the trigger switch 52 is inserted, for example, between the motor 53 and the motor control unit 55, and when a user pushes the trigger switch 52, power is supplied to the motor 53 and the motor 53 rotates. When the user makes the trigger switch 52 return, the rotation of the motor 53 is stopped.

Configuration of Battery Pack

Figure 4:
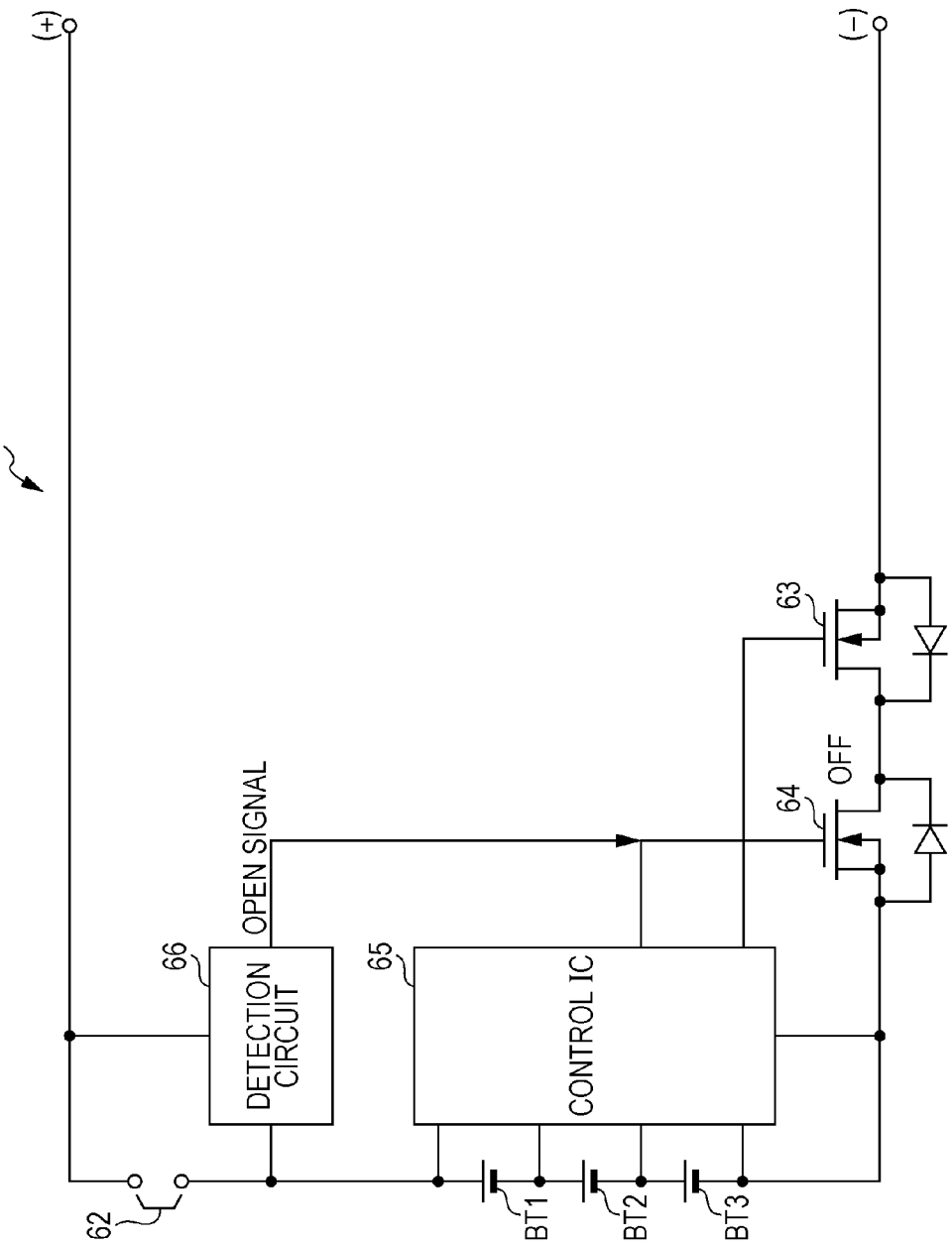
FIG. 4 is a connection diagram of a battery pack according to a first embodiment of the present disclosure.

FIG. 4 shows a configuration example of the battery pack 1 according to the first embodiment. In the battery pack 1, battery cells BT1, BT2, and BT3 (when it is not necessary to particularly distinguish these battery cells, these battery cells are collectively called BT) of a secondary battery, for example, a lithium ion secondary battery are connected, for example, in series. A plurality of battery cells may be connected in parallel with each other, or groups of the plurality of battery cells connected in series may be connected in parallel with each other. In the case of using a lithium ion battery in which a fully charged voltage of each battery cell is, for example, 4.2 V, a fully charged voltage of the battery pack 1 becomes 12.6 V.

A positive (+) side of the battery cells BT is connected to a positive side power supply terminal through a PTC-mounted thermostat 62. The PTC-mounted thermostat 62, which is an example of a current control element, has the same configuration as the above-described PTC-mounted thermostat 12, and performs the same operation as the PTC-mounted thermostat 12. A negative (−) side of the battery cells BT is connected to a negative side power supply terminal through a discharge control FET 64 and a charge control FET 63. The charge control FET 63 and the discharge control FET 64 are formed of, for example, an N-channel FET. The charge control FET 63 and the discharge control FET 64 may be configured by a switching element such as an IGBT (Insulated Gate Bipolar Transistor).

Each voltage of the battery cells BT is measured by a control IC (Integrated Circuit) 65. The control IC 65 measures a charge current and a discharge current of the battery cells BT. The measurement of a voltage and a current is automatically performed at a predetermined frequency. For example, when becoming an overcharge state, the charge control FET 63 is turned off by a control of the control IC 65. When becoming an overdischarge state, the discharge control FET 64 is turned off by a control of the control IC 65.

The battery pack 1 includes a detection circuit 66 as an example of a detection unit. The detection circuit 66 measures, for example, a voltage at both ends of the PTC-mounted thermostat 62. A voltage at the both ends when contacts of the PTC-mounted thermostat 62 (not shown in FIGS. 1A to 1D) come into contact with each other, and a voltage at the both ends when the contacts of the PTC-mounted thermostat 62 are separated (opened) are different from each other. The detection circuit 66 detects the voltage at the both ends of the PTC-mounted thermostat 62, and determines whether the contacts of the PTC-mounted thermostat 62 come into contact with each other or are separated from each other. The detection circuit 66 outputs an open signal of a low level or a high level according to a state in which the contacts come into contact with each other or a state the contacts are separated from each other.

For example, the detection circuit 66 outputs the open signal of the high level when the contacts of the PTC-mounted thermostat 62 come into contact with each other, and outputs the open signal of the low level when the contacts of the PTC-mounted thermostat 62 are opened. Of course, the detection circuit 66 may output the open signal of the low level when the contacts of the PTC-mounted thermostat 62 come into contact with each other, and may output the open signal of the high level when the contacts of the PTC-mounted thermostat 62 are opened. In addition, when the low level is, for example, 0 volt (V), the outputting of the open signal of the low level is equivalent to that the output of the open signal is stopped. The open signal output from the detection circuit 66 is supplied to the discharge control FET 64.

Operation of Battery Pack

An operation example of the battery pack 1 will be described. In a dischargeable state, the contacts of the PTC-mounted thermostat 62 come into contact with each other. When the contacts of the PTC-mounted thermostat 62 come into contact with each other, the detection circuit 66 outputs, for example, the open signal of the high level. When the output open signal of the high level is supplied to the discharge control FET 64, the discharge control FET 64 is turned on. In addition, the discharge control FET 64 may be turned on by a control of the control IC 65.

When an overcurrent flows through a current path of the battery pack 1, the contacts of the PTC-mounted thermostat 62 are opened. When the contacts of the PTC-mounted thermostat 62 are opened, the voltage of the both ends of the PTC-mounted thermostat 62 varies. This variation in voltage is detected by the detection circuit 66. When detecting the voltage variation, the detection circuit 66 changes the level of the open signal, for example, from the high level to the low level and then outputs the open signal of the changed level. Then, the open signal of the low level is supplied to the discharge control FET 64. When the open signal of the low level is supplied, the discharge control FET 64 is turned off and thereby the discharge is prohibited.

In the first embodiment, when the overcurrent flows in the battery pack 1, the contacts of the PTC-mounted thermostat 62 are opened and thereby the overcurrent is interrupted. In addition, the discharge control FET 64 is turned off according to the opening of the contacts of the PTC-mounted thermostat 62. Therefore, double protective functions operate, and the safety of the battery pack 1 may be improved.

Second Embodiment

Figure 5:
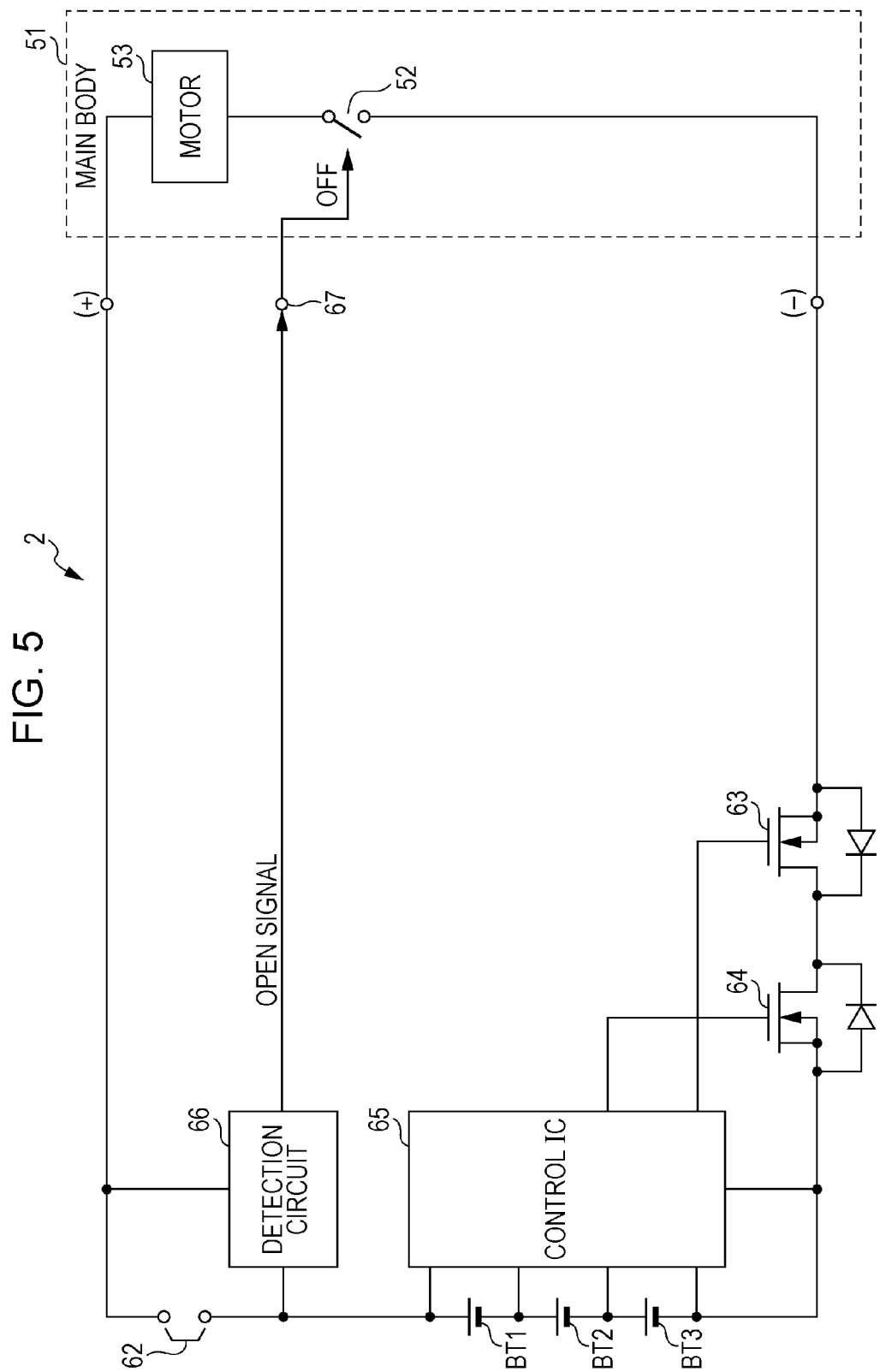
FIG. 5 is a connection diagram of a battery pack according to a second embodiment of the present disclosure.

FIG. 5 shows a configuration example of a battery pack 2 according to a second embodiment. In addition, in this second embodiment, like reference numerals will be given to like parts having substantially the same functions, and redundant description thereof will be appropriately omitted.

In the second embodiment, a switch of an external apparatus is forcibly turned off according to an open signal output from the detection circuit 66. The external apparatus is, for example, the electric screwdriver 51. The switch of the external apparatus is, for example, the trigger switch 52. In addition, the switch of the external apparatus may be a switch provided separately from the trigger switch 52.

For example, the trigger switch 52 of the electric screwdriver 51 is connected to the motor 53 in series. The battery pack 2 includes a control terminal 67 connected to the electric screwdriver 51. The control terminal 67 is a connection portion of a connector or the like. In addition, the control terminal 67 may be a terminal that can perform a communication. The open signal output from the detection circuit 66 is supplied to the electric screwdriver 51 through the control terminal 67.

An operation example of the battery pack 2 will be described. When an overcurrent flows to the battery pack 2, the contacts of the PTC-mounted thermostat 62 are opened. The detection circuit 66 outputs an open signal to turn off the trigger switch 52 of the electric screwdriver 51 according to the opening of the contacts of the PTC-mounted thermostat 62. For example, the detection circuit 66 outputs the open signal of a low level. The open signal of the low level output from the detection circuit 66 is supplied to the electric screwdriver 51 through a control terminal 67. The electric screwdriver 51 receives the supplied open signal. The trigger switch 52 is forcibly turned off according to the open signal supplied from the battery pack 2.

In addition, the trigger switch 52 may be turned off through the control unit of the electric screwdriver 51. For example, the trigger switch 52 may be turned off by a control of the motor control unit 55 to which the open signal of the low level is supplied. The trigger switch 52 may be turned off by the open signal of a high level.

In the second embodiment, when the overcurrent flows in the battery pack 2, the contacts of the PTC-mounted thermostat 62 are opened and thereby the overcurrent is interrupted. In addition, the switch of the external apparatus, which is connected to the battery pack 2, is turned off according to the opening of the contacts of the PTC-mounted thermostat 62. Therefore, it is possible to interrupt the overcurrent in the battery pack 2, and it is possible to make the external apparatus do not operate.

Third Embodiment

Figure 6:
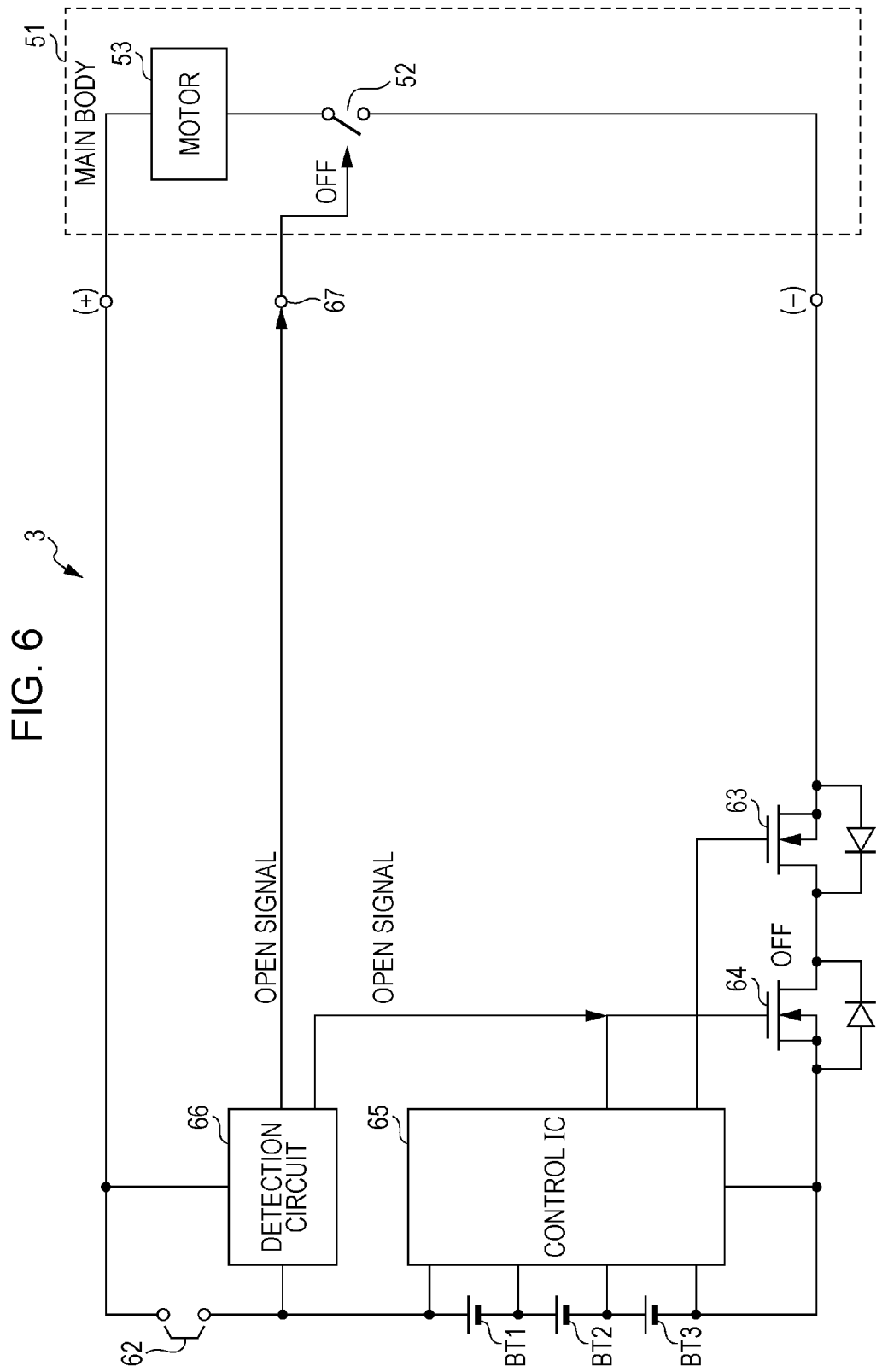
FIG. 6 is a connection diagram of a battery pack according to a third embodiment of the present disclosure.

FIG. 6 shows a configuration example of a battery pack 3 according to a third embodiment. In the battery pack 3, like reference numerals will be given to like parts having substantially the same functions, and redundant description thereof will be appropriately omitted.

In the third embodiment, switches of the discharge control FET 64 and an external apparatus are forcibly turned off according to the open signal output from the detection circuit 66. The external apparatus is, for example, the electric screwdriver 51. An operation example of the battery pack 3 will be described. When an overcurrent flows to the battery pack 3, the contacts of the PTC-mounted thermostat 62 are opened. The detection circuit 66 outputs, for example, an open signal of a low level according to the opening of the contacts of the PTC-mounted thermostat 62. The open signal of the low level, which is output from the detection circuit 66, is supplied to the discharge control FET 64. The discharge control FET 64 is turned off by the open signal of the low level, which is supplied from the detection circuit 66.

In addition, the open signal of the low level, which is output from the detection circuit 66, is supplied to the electric screwdriver 51 through the control terminal 67. The trigger switch 52 of the electric screwdriver 51 is forcibly turned off by the open signal of the low level. Since the trigger switch 52 is forcibly turned off, even when a user operates the trigger switch 52, the electric screwdriver 51 does not operate.

In addition, the trigger switch 52 may be turned off through the control unit of the electric screwdriver 51. For example, the trigger switch 52 may be forcibly turned off by a control of the motor control unit 55 to which the open signal of the low level is supplied.

In the third embodiment, when the overcurrent flows in the battery pack 3, the contacts of the PTC-mounted thermostat 62 are opened and thereby the overcurrent is interrupted. In addition, the discharge control FET 64 is turned off and the trigger switch 52 of the electric screwdriver 51 is forcibly turned off according to the opening of the contacts of the PTC-mounted thermostat 62. Therefore, the safety of the battery pack may be improved, and it is possible to make the external apparatus not operate.

Fourth Embodiment

Figure 7:
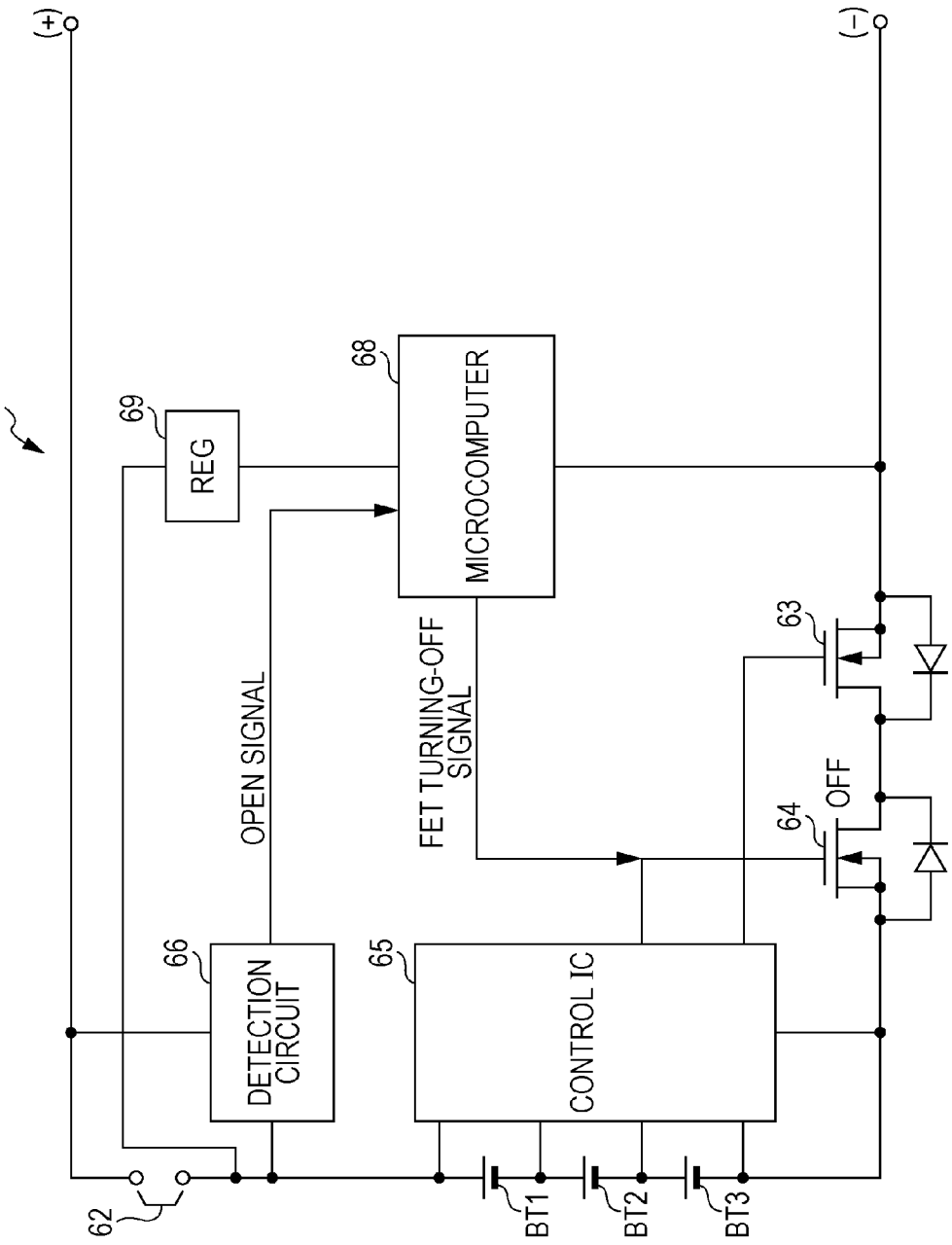
FIG. 7 is a connection diagram of a battery pack according to a fourth embodiment of the present disclosure.

FIG. 7 shows a configuration example of a battery pack 4 according to fourth embodiment. In addition, in the battery pack 4, like reference numerals will be given to like parts having substantially the same functions, and redundant description thereof will be appropriately omitted.

The battery pack 4 includes a microcomputer 68 and a regulator (REG) 69. The microcomputer 68, which is an example of the control unit, controls each unit of the battery pack 4. For example, the microcomputer 68 performs a control to turn on and off the discharge control FET 64. The regulator 69 is, for example, a series regulator. An input line of the regulator 69 is connected to, for example, a line between a positive side of the battery cells BT and the PTC-mounted thermostat 62. The regulator 69 generates a voltage that makes the microcomputer 68 operate using a voltage of the battery cells BT. The regulator 69 generates, for example, a voltage of 3.3 to 5.0 V.

An operation example of the battery pack 4 will be described. When an overcurrent flows to the battery pack 4, the PTC-mounted thermostat 62 operates and thereby the contacts of the PTC-mounted thermostat 62 are opened. The detection circuit 66 outputs, for example, an open signal of a low level according to the opening of the contacts of the PTC-mounted thermostat 62. The open signal of the low level, which is output from the detection circuit 66, is supplied to the microcomputer 68. When the open signal of the low level is supplied from the detection circuit 66, the microcomputer 68 performs a control to turn off the discharge control FET 64. For example, the microcomputer 68 supplies the control signal of the low level to the discharge control FET 64. The discharge control FET 64 is turned off by the supplied control signal of the low level.

In this manner, the discharge control FET 64 may be turned off by the control of the microcomputer 68. When the overcurrent flows to the battery pack 4, the contacts of the PTC-mounted thermostat 62 are opened and thereby the overcurrent is interrupted. In addition, the discharge control FET 64 is turned off by the control of the microcomputer 68. Therefore, double overcurrent protecting functions operate, such that the safety of the battery pack is improved.

Fifth Embodiment

Figure 8:
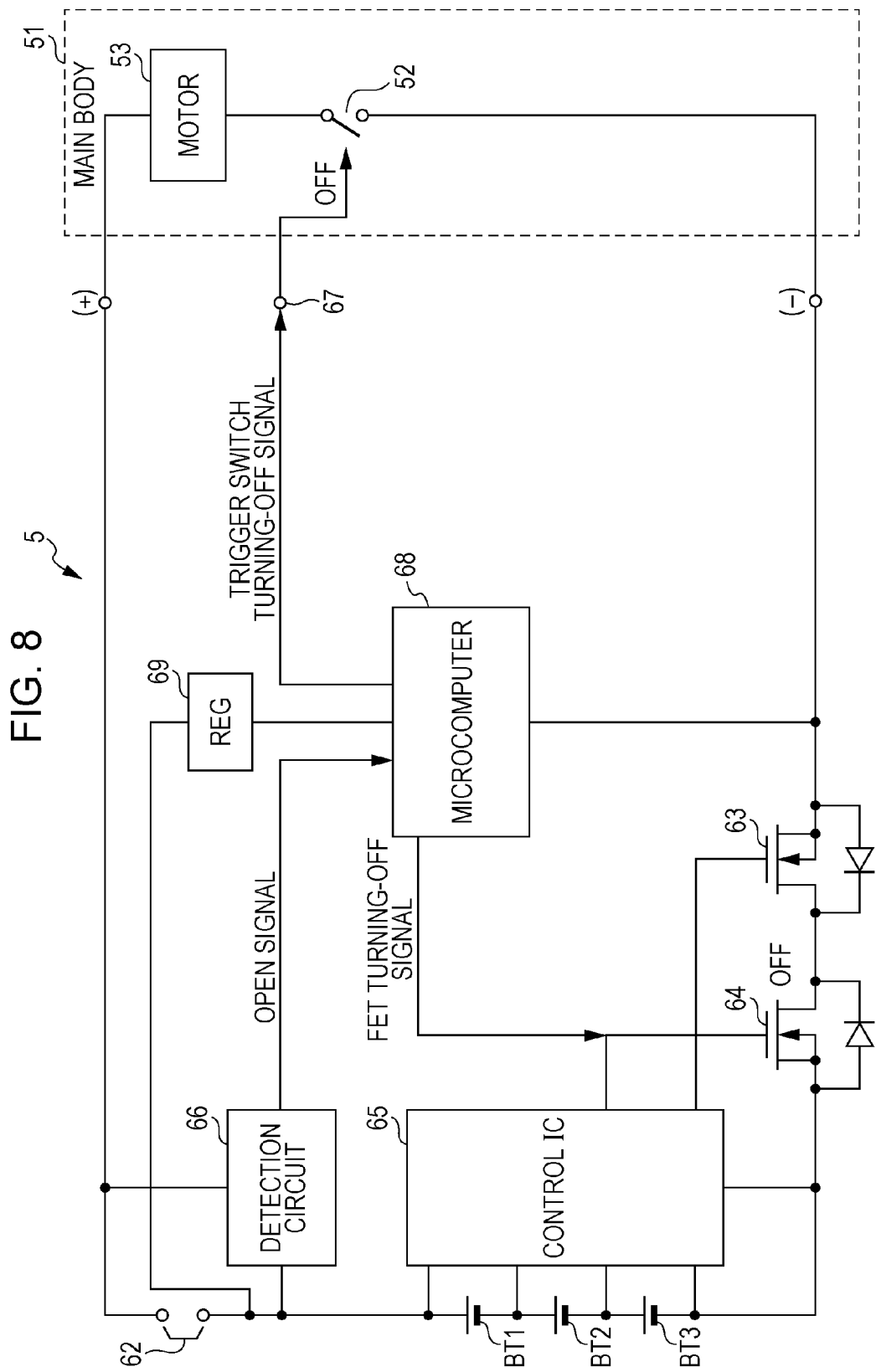
FIG. 8 is a connection diagram of a battery pack according to a fifth embodiment of the present disclosure.

FIG. 8 shows a configuration example of a battery pack 5 according to a fifth embodiment. In addition, in the battery pack 5, like reference numerals will be given to like parts having substantially the same functions, and redundant description thereof will be appropriately omitted.

The battery pack 5 is connected to an external apparatus. The external apparatus is, for example, the electric screwdriver 51. The electric screwdriver 51 has, for example, the trigger switch 52 that is connected to the motor 53 in series. An operation example of the battery pack 5 will be described. When an overcurrent flows to the battery pack 5, the PTC-mounted thermostat 62 operates and thereby the contacts of the PTC-mounted thermostat 62 are opened. The opening of the contacts of the PTC-mounted thermostat 62 is detected by the detection circuit 66.

The detection circuit 66 that detects the opening of the contacts outputs, for example, an open signal of a low level. The open signal of the low level, which is output from the detection circuit 66, is supplied to the microcomputer 68. When the open signal of the low level is supplied, the microcomputer 68 performs a control to turn off the discharge control FET 64. For example, the microcomputer 68 supplies a control signal of a low level with respect to the discharge control FET 64. The discharge control FET 64 is turned off by the control signal by the supplied control signal of the low level.

In addition, the microcomputer 68 generates a control signal (trigger switch turning-off signal) that turns off the trigger switch 52 of the electric screwdriver 51. The microcomputer 68 supplies the generated trigger switch turning-off signal to the electric screwdriver 51 through the control terminal 67. The trigger switch 52 is turned off by the trigger switch turning-off signal that is supplied from the microcomputer 68.

In addition, the trigger switch 52 may be turned off by the control unit of the electric screwdriver 51. For example, the trigger switch turning-off signal is supplied to the motor control unit 55. The trigger switch 52 may be turned off by the control of the motor control unit 55 to which the trigger switch turning-off signal is supplied.

In the fifth embodiment, when the overcurrent flows to the battery pack 5, the contacts of the PTC-mounted thermostat 62 are opened and thereby the overcurrent is interrupted. In addition, a control is performed to turn off the discharge control FET 64 and the trigger switch 52 according to the opening of the contacts of the PTC-mounted thermostat 62. Therefore, safety of the battery pack 5 may be improved. In addition, it is possible to perform a control so as to make the electric screwdriver 51 not operate.

Sixth Embodiment

Figure 9:
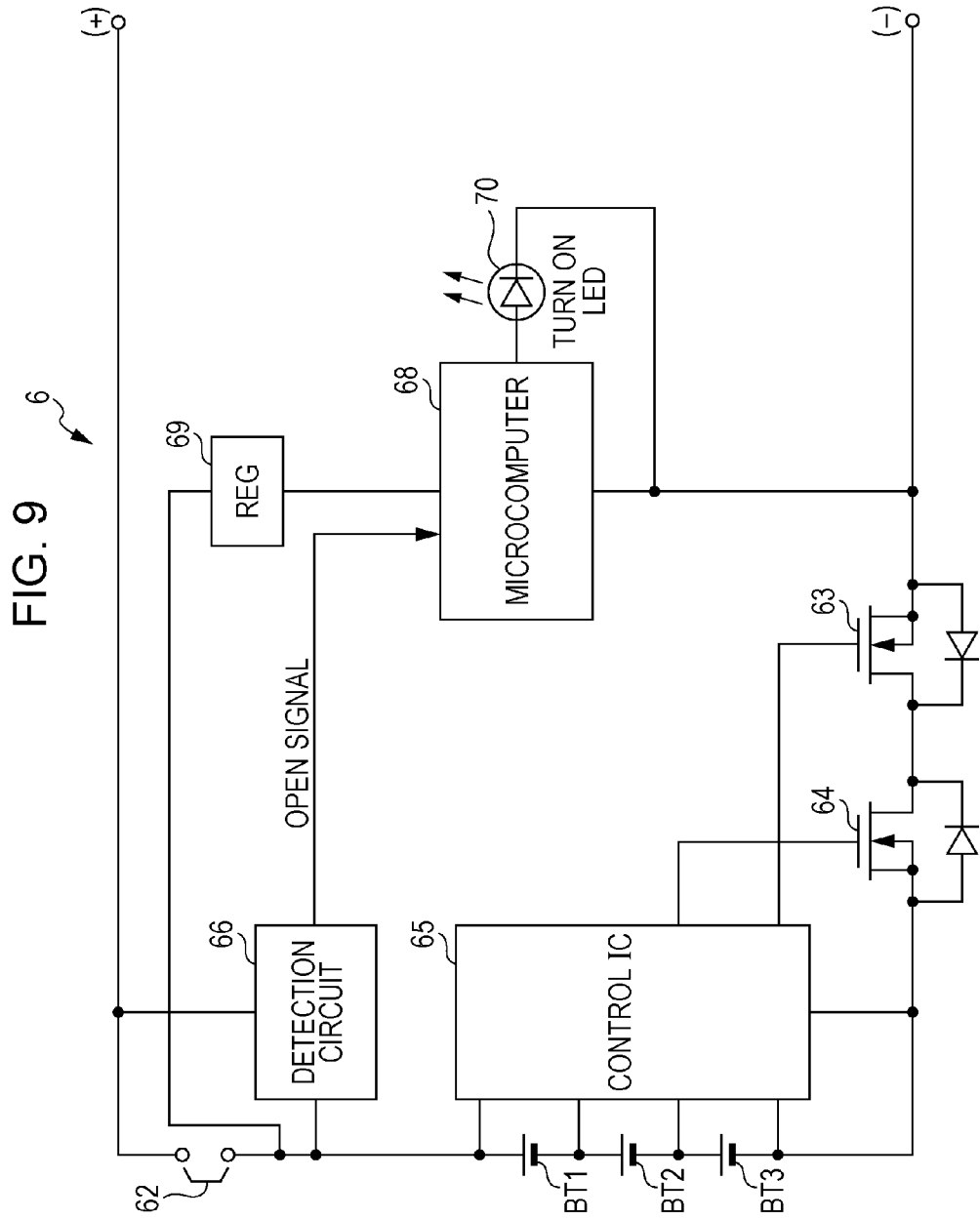
FIG. 9 is a connection diagram of a battery pack according to a sixth embodiment of the present disclosure.

FIG. 9 shows a configuration example of a battery pack 6 according to sixth embodiment. In addition, in the battery pack 6, like reference numerals will be given to like parts having substantially the same functions, and redundant description thereof will be appropriately omitted.

The battery pack 6 includes a LED (Light Emitting Diode) 70 as an example of a light-emitting portion. The LED 70 is provided at, for example, a position where a user visually recognizes the LED 70 in a case where the battery pack 6 is mounted in an external apparatus or a charging device. Light emission and extinction of the LED 70 are controlled by the microcomputer 68. The microcomputer 68 controls the light emission of the LED 70 according to an open signal of a high level or a low level, which is supplied from the detection circuit 66.

Figure 10:
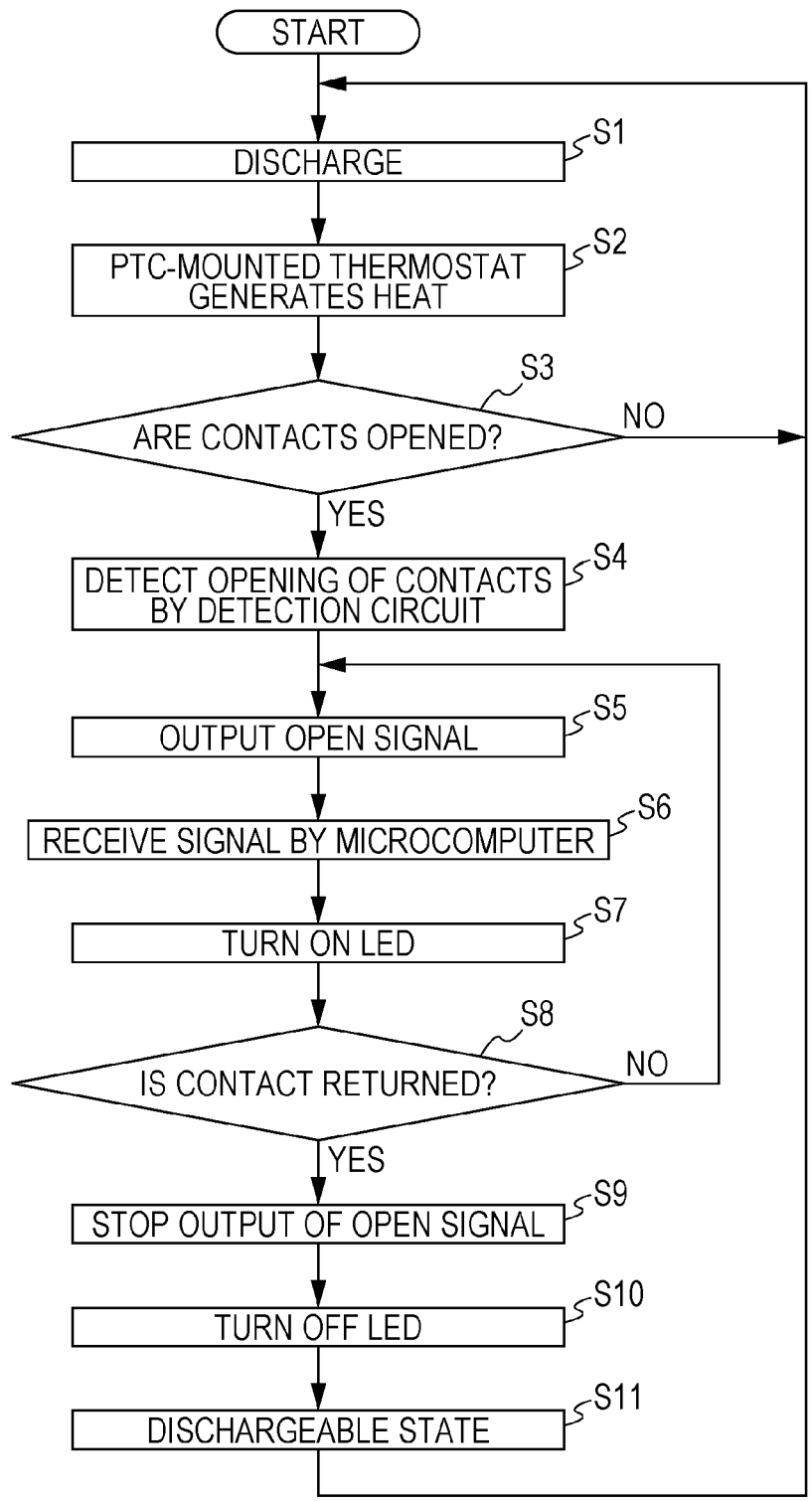
FIG. 10 is a flow chart illustrating an operation of the battery pack according to the sixth embodiment of the present disclosure.

An operation example of the battery pack 6 will be described with reference to a flow chart shown in FIG. 10. In step S1, a discharge current flows to a current path of the battery pack 6. In a dischargeable state, the contacts of the PTC-mounted thermostat 62 come into contact with each other. The detection circuit 66 supplies an open signal indicating that the contacts of the PTC-mounted thermostat 62 come into contact with each other to the microcomputer 68. For example, the detection circuit 66 supplies the open signal of a low level to the microcomputer 68. Then, the process proceeds to step S2. In step S2, the PTC-mounted thermostat 62 generates heat due to the discharge current. Then, the process proceeds to step S3.

In step S3, it is determined whether or not the contacts of the PTC-mounted thermostat 62 are opened. That is, it is determined whether or not the contacts of the PTC-mounted thermostat 62 are opened due to flowing of the overcurrent to a current path of the battery pack 6 and an increase of the heat generation in the PTC-mounted thermostat 62. In a case where the contacts are not opened, the process returns to step S1. In a case where the contacts are opened, the process proceeds to step S4.

In step S4, the opening of the contacts of the PTC-mounted thermostat 62 is detected by the detection circuit 66. For example, the detection circuit 66 detects the opening of the contacts by detecting variation of a voltage at both ends of the PTC-mounted thermostat 62. Then, the process proceeds to step S5.

In step S5, the detection circuit 66 supplies the open signal indicating the opening of the contacts to the microcomputer 68. For example, the detection circuit 66 supplies the open signal of a high level to the microcomputer 68 by newly changing the signal level from low to high. The detection circuit 66 supplies the open signal of the high level to the microcomputer 68 while the contacts of the PTC-mounted thermostat 62 are opened. Then, the process proceeds to step S6.

In step S6, the open signal of the high level, which is output from the detection circuit 66, is received by the microcomputer 68. Then, the process proceeds to step S7. In step S7, the microcomputer 68 that receives the open signal of the high level performs a control to turn on the LED 70. Then, the process proceeds to step S8.

In step S8, it is determined whether or not the contacts of the PTC-mounted thermostat 62 again come into contact with each other, that is, whether or not one of the contacts returns. In the case of not returning, the process returns to step S5, and the detection circuit 66 continuously outputs the open signal of the high level. When the PTC-mounted thermostat 62 is cooled down and thereby the contact of the PTC-mounted thermostat 62 returns, the process proceeds to step S9.

In step S9, the returning of the contact of the PTC-mounted thermostat 62 is detected by the detection circuit 66. For example, the detection circuit 66 detects the returning of the contact by detecting the variation in a voltage of both ends of the PTC-mounted thermostat 62. When detecting the returning of the contact, the detection circuit 66 stops the output of the open signal of the high level. For example, the detection circuit 66 newly changes the signal level from high to low, and outputs the open signal of the low level. Then, the process proceeds to step S10.

In step S10, the open signal of the low level, which is output from the detection circuit 66, is received by the microcomputer 68. The microcomputer 68, which receives the open signal of the low level, performs a control to turn off the LED 70. Then, the process proceeds to step S11. In step S11, a user can recognize that the battery pack 6 has become a dischargeable state from the turning off the LED 70. Then, the process returns to step S1.

In the sixth embodiment, the light emission of the LED 70 is controlled by the opening and closing of the contacts of the PTC-mounted thermostat 62. Therefore, the user can visually recognize that the contact of the PTC-mounted thermostat 62 returns and the battery pack 6 becomes a dischargeable state. In addition, the LED 70 may be made to be turned on at a dischargeable state. In addition, a plurality of LEDs is provided, and the LEDs of a different color may be made to emit light according to the opening and closing of the contacts of the PTC-mounted thermostat 62. In addition, the user may recognize that the battery pack 6 has become a dischargeable state by a reproduction of a voice or a display of characters without being limited to the LED.

Seventh Embodiment

Figure 11:
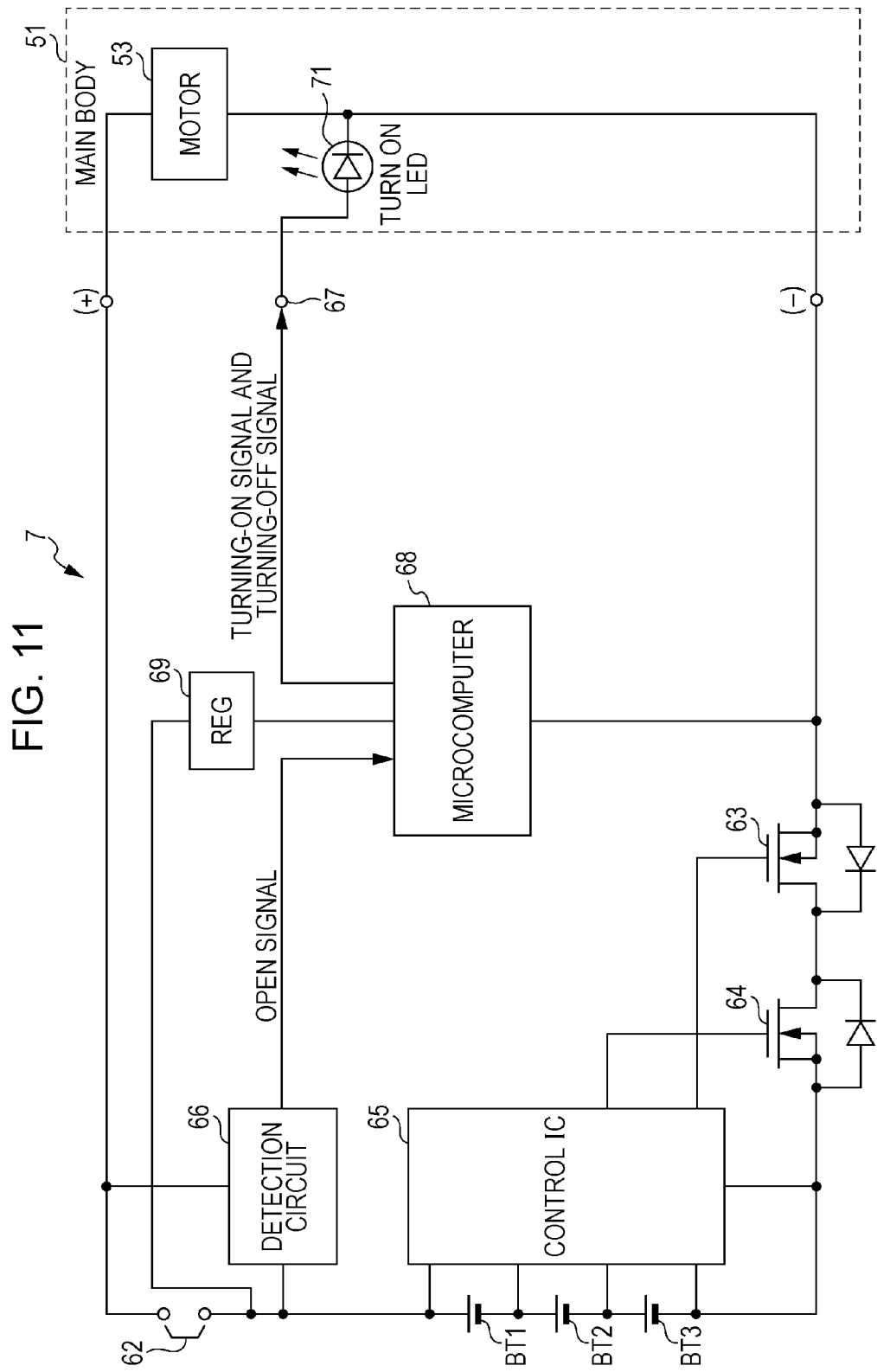
FIG. 11 is a connection diagram of a battery pack according to a seventh embodiment of the present disclosure.

FIG. 11 shows a configuration example of a battery pack 7 according to a seventh embodiment. In addition, in the battery pack 7, like reference numerals will be given to like parts having substantially the same functions, and redundant description thereof will be appropriately omitted.

The battery pack 7 is detachably mounted in an external apparatus (main body). The external apparatus is, for example, the electric screwdriver 51. The electric screwdriver 51 includes a LED 71. A user of the electric screwdriver 51 can visually recognize a light emission state of the LED 71. Light emission of the LED 71 is controlled by a turning-on signal and a turning-off signal output from the microcomputer 68 of the battery pack 7.

Figure 12:
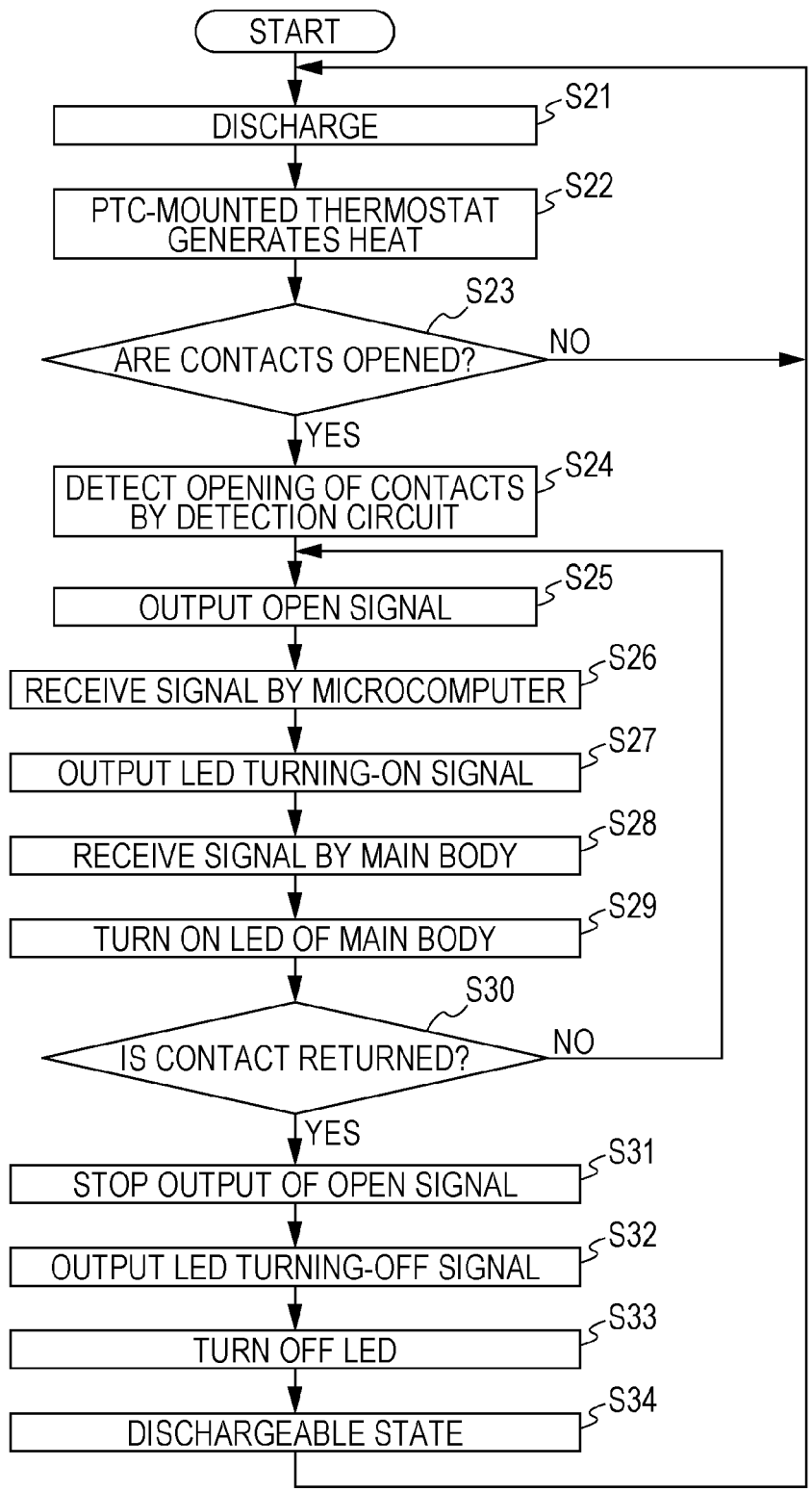
FIG. 12 is a flow chart illustrating an operation of the battery pack according to the seventh embodiment of the present disclosure.

An operation example of the battery pack 7 will be described with reference to a flow chart shown in FIG. 12. In step S21, a discharge current flows to a current path of the battery pack 7. In a dischargeable state, the contacts of the PTC-mounted thermostat 62 come into contact with each other. The detection circuit 66 supplies an open signal indicating that the contacts of the PTC-mounted thermostat 62 come into contact with each other to the microcomputer 68. For example, the detection circuit 66 supplies the open signal of a low level to the microcomputer 68. Then, the process proceeds to step S22. In step S22, the PTC-mounted thermostat 62 generates heat due to the discharge current. Then, the process proceeds to step S23.

In step S23, it is determined whether or not the contacts of the PTC-mounted thermostat 62 are opened due to flowing of the overcurrent to a current path of the battery pack 7. In a case where the contacts are not opened, the process returns to step S21. In a case where the contacts are opened, the process proceeds to step S24.

In step S24, the opening of the contacts of the PTC-mounted thermostat 62 is detected by the detection circuit 66. For example, the detection circuit 66 detects the opening of the contacts by detecting variation of a voltage at both ends of the PTC-mounted thermostat 62. Then, the process proceeds to step S25.

In step S25, the detection circuit 66 supplies the open signal indicating the opening of the contacts to the microcomputer 68. For example, the detection circuit 66 supplies the open signal of a high level to the microcomputer 68 by newly changing the signal level from low to high. The detection circuit 66 supplies the open signal of the high level to the microcomputer 68 while the contacts of the PTC-mounted thermostat 62 are opened. Then, the process proceeds to step S26.

In step S26, the open signal of the high level, which is output from the detection circuit 66, is received by the microcomputer 68. Then, the process proceeds to step S27. In step S27, the microcomputer 68 that receives the open signal of the high level generates a turning-on signal to turn on the LED 71. The microcomputer 68 outputs the generated turning-on signal. Then, the process proceeds to step S28.

In step S28, the turning-on signal, which is output from the microcomputer 68, is supplied to the electric screwdriver 51 through the control terminal 67. Then, the process proceeds to step S29. In step S29, the LED 71 of the electric screwdriver 51 is turned on by the turning-on signal supplied from the battery pack 7. A user can recognize that the battery pack 7 has become a discharge prohibition state and the electric screwdriver 51 does not operate from the turning-on of the LED 71. Then, the process proceeds to step S30.

In step S30, it is determined whether or not the contacts of the PTC-mounted thermostat 62 again come into contact with each other, that is, whether or not one of the contacts returns. In the case of not returning, the process returns to step S25, and the detection circuit 66 continuously outputs the open signal of the high level. When the PTC-mounted thermostat 62 is cooled down and thereby the contacts of the PTC-mounted thermostat 62 return, the process proceeds to step S31.

In step S31, the returning of the contact of the PTC-mounted thermostat 62 is detected by the detection circuit 66. For example, the detection circuit 66 detects the returning of the contact by detecting the variation in a voltage of both ends of the PTC-mounted thermostat 62. When detecting the returning of the contact, the detection circuit 66 stops the output of the open signal of the high level. For example, the detection circuit 66 newly changes the signal level from high to low, and outputs the open signal of the low level. Then, the process proceeds to step S32.

In step S32, the open signal of the low level, which is output from the detection circuit 66, is received by the microcomputer 68. The microcomputer 68, which receives the open signal of the low level, outputs a turning-off signal to turn off the LED 71. The turning-off signal output from the microcomputer 68 is supplied to the electric screwdriver 51 through the control terminal 67. Then, the process proceeds to step S33.

In step S33, the LED 71 of the electric screwdriver 51 is turned off by the turning-off signal supplied from the battery pack 7. Then, the process proceeds to step S34. From the turning-off of the LED 71, a user can recognize that the battery pack 7 has become a dischargeable state and the electric screwdriver 51 has become a state in which the electric screwdriver 51 operates. Then, the process returns to step S21.

In addition, the light emission of the LED 71 of the electric screwdriver 51 may be controlled by the control unit of the electric screwdriver 51. For example, a turning-on signal or a turning-off signal is supplied to the motor control unit 55 of the electric screwdriver 51. The motor control unit 55 may control the light emission of the LED 71 according to the supplied turning-on signal or the turning-off signal.

In the seventh embodiment, the light emission of the LED 71 provided to the electric screwdriver 51 is controlled by the opening and closing of the contacts of the PTC-mounted thermostat 62. Therefore, the user can visually recognize that the contact of the PTC-mounted thermostat 62 returns and it has become a state in which the electric screwdriver 51 operates. In addition, in the seventh embodiment, the LED may be also provided to the battery pack side similarly to the sixth embodiment.

Eighth Embodiment

Figure 13:
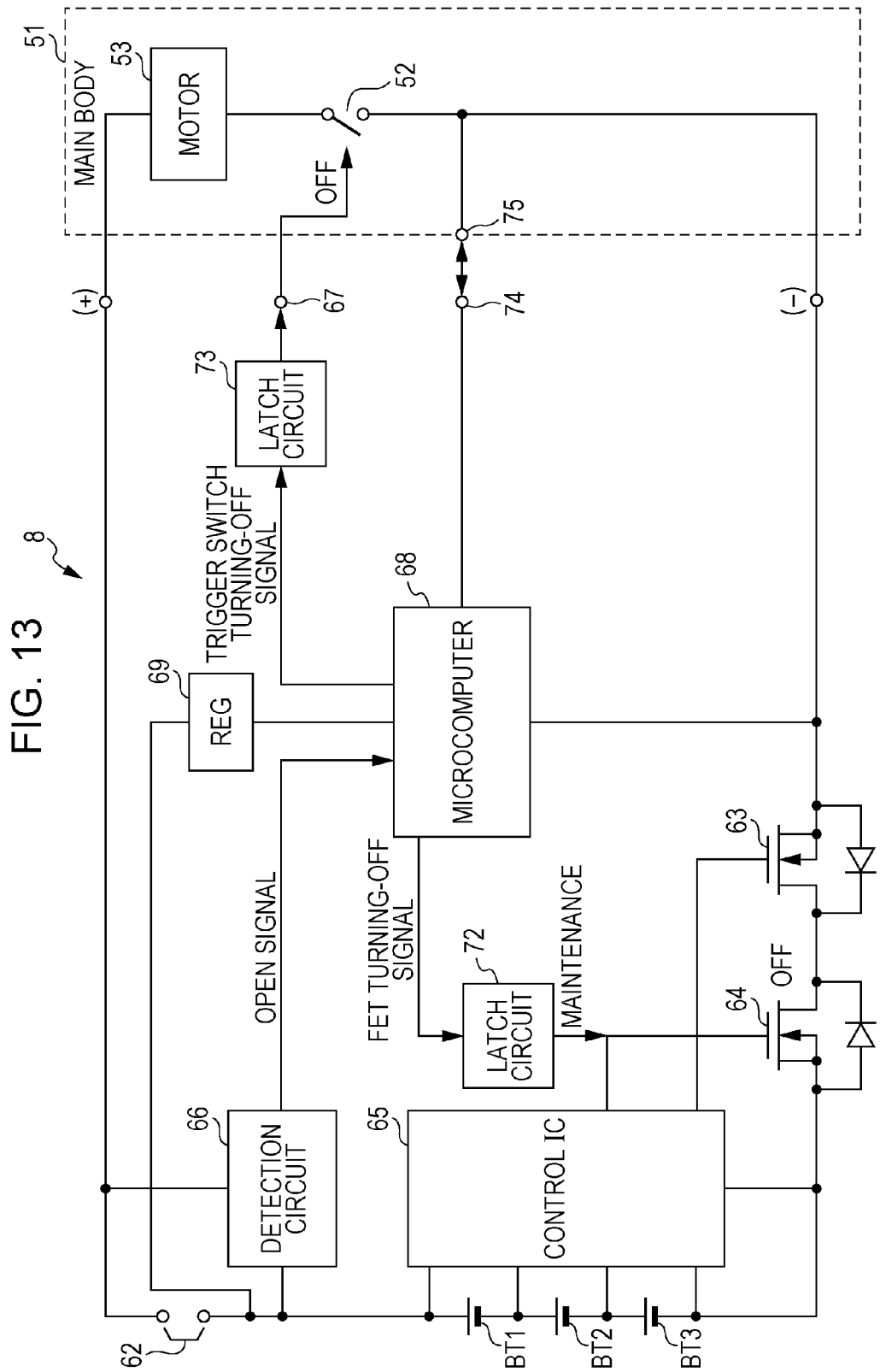
FIG. 13 is a connection diagram of a battery pack according to an eighth embodiment of the present disclosure.

FIG. 13 shows a configuration example of a battery pack 8 according to an eighth embodiment. In addition, in the battery pack 8, like reference numerals will be given to like parts having substantially the same functions, and redundant description thereof will be appropriately omitted.

The battery pack 8 includes a latch circuit 72 and a latch circuit 73 as an example of a maintaining unit. The latch circuit 72 and the latch circuit 73 maintain a control performed by the microcomputer 68. A communication terminal 74 that performs a communication with an external apparatus may be provided with respect to the battery pack 8.

The external apparatus is, for example, the electric screwdriver 51. The electric screwdriver 51 includes a communication terminal 75. A communication between the microcomputer 68 and the control unit of the electric screwdriver 51 are established through the communication terminal 74 and the communication terminal 75. The control unit of the electric screwdriver 51 is, for example, the motor control unit 55. For example, a communication compliant to SMBus (System Management Bus) standard is established between the microcomputer 68 and the motor control unit 55.

The battery pack 8 maintains the discharge prohibition state even when the contact of the PTC-mounted thermostat 62 returns. In addition, in a case where one of the contacts of the PTC-mounted thermostat 62 returns, the battery pack 8 may maintain the discharge prohibition state and the operation prohibition state of the external apparatus.

Figure 14:
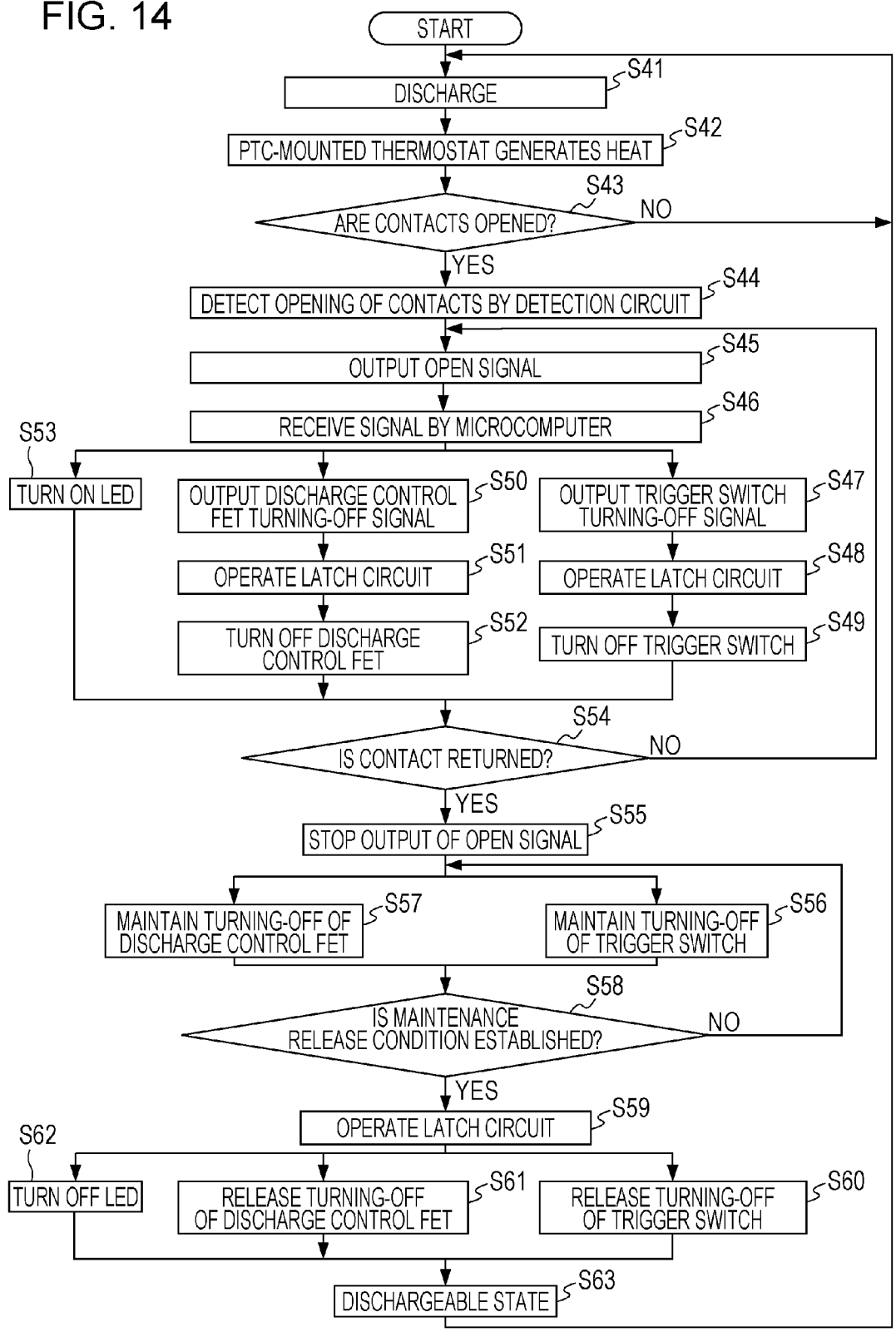
FIG. 14 is a flow chart illustrating an operation of the battery pack according to the eighth embodiment of the present disclosure.

Hereinafter, an operation example of the battery pack 8 will be described with reference to a flow chart shown in FIG. 14. In step S41, a discharge current flows to a current path of the battery pack 8. In a dischargeable state, the contacts of the PTC-mounted thermostat 62 come into contact with each other. The detection circuit 66 measures a voltage of both ends of the PTC-mounted thermostat 62, and outputs an open signal indicating that the contacts of the PTC-mounted thermostat 62 come into contact with each other. For example, the detection circuit 66 outputs the open signal of a low level. The output open signal is supplied to the microcomputer 68.

In a common discharge state (dischargeable state), the latch circuit 72 and the latch circuit 73 may be opened. In the common discharge state, on and off of the discharge control FET 64 is controlled by, for example, the control IC 65. The microcomputer 68 may control on and off of the discharge control FET 64 by using a signal path not passing through the latch circuit 72. The trigger switch 52 is controlled to a state in which an operation of a user becomes effective. Then, the process proceeds to step S42.

In step S42, the PTC-mounted thermostat 62 generates heat due to the discharge current. Then, the process proceeds to step S43. In step S43, it is determined whether or not the contacts of the PTC-mounted thermostat 62 are opened. That is, it is determined whether or not the contacts of the PTC-mounted thermostat 62 are opened due to flowing of the overcurrent to a current path of the battery pack 8 and an increase of the heat generation in the PTC-mounted thermostat 62. In a case where the contacts are not opened, the process returns to step S41. In a case where the contacts are opened, the process proceeds to step S44.

In step S44, the opening of the contacts of the PTC-mounted thermostat 62 is detected by the detection circuit 66. For example, the detection circuit 66 detects the opening of the contacts by detecting variation of a voltage at both ends of the PTC-mounted thermostat 62. Then, the process proceeds to step S45.

In step S45, the detection circuit 66 supplies the open signal indicating the opening of the contacts to the microcomputer 68. For example, the detection circuit 66 supplies the open signal of a high level to the microcomputer 68 by newly changing the signal level from low to high. The detection circuit 66 supplies the open signal of the high level to the microcomputer 68 while the contacts of the PTC-mounted thermostat 62 are opened. Then, the process proceeds to step S46.

In step S46, the open signal of the high level, which is output from the detection circuit 66, is received by the microcomputer 68. Then, the process proceeds to step S47, step S50, and step S53. In step S47, the microcomputer 68 that receives the open signal of the high level performs a control to turn off the trigger switch 52. For example, the microcomputer 68 supplies a trigger pulse to the latch circuit 73. Then, the process proceeds to step S48.

In step S48, the latch circuit 73 operates by the trigger pulse supplied from the microcomputer 68. For example, the latch circuit 73 outputs a signal of a low level according to the trigger pulse. The signal of the low level, which is output from the latch circuit 73, is supplied to the trigger switch 52 through the control terminal 67. Then, the process proceeds to step S49. In step S49, the trigger switch 52 is forcibly turned off by the signal of the low level supplied from the latch circuit 73. Since the trigger switch 52 is forcibly turned off, the electric screwdriver 51 becomes an operation prohibition state. The latch circuit 73 maintains the output of the signal of the low level.

In step S50, the microcomputer 68 that receives the open signal of the high level performs a control to turn off the discharge control FET 64. For example, the microcomputer 68 supplies the trigger pulse to the latch circuit 72. Then, the process proceeds to step S51.

In step S51, the latch circuit 72 operates by the trigger pulse supplied from the microcomputer 68. For example, the latch circuit 72 outputs a signal of a low level according to the trigger pulse. The signal of the low level, which is output from the latch circuit 72, is supplied to the discharge control FET 64. Then, the process proceeds to step S52.

In step S52, the discharge control FET 64 is turned off by the signal of the low level supplied from the latch circuit 72. Since the discharge control FET 64 is turned off, the battery pack 8 becomes a discharge prohibition state. The latch circuit 72 maintains the output of the signal of the low level. After the latch circuit 72 operates, the on and off of the discharge control FET 64 may be controlled according to only the signal supplied from the latch circuit 72.

In step S53, a control to turn on a LED (not shown) provided to the battery pack 8 or the electric screwdriver 51 may be performed. In addition, details of this control are the same as those in the above-described sixth or seventh embodiment. When the control to turn off the trigger switch 52 and the discharge control FET 64 is performed, the process proceeds to step S54.

In step S54, it is determined whether or not the contacts of the PTC-mounted thermostat 62 again come into contact with each other, that is, whether or not one of the contacts returns. In the case of not returning, the process returns to step S45. When the PTC-mounted thermostat 62 is cooled down and thereby the contact of the PTC-mounted thermostat 62 returns, the process proceeds to step S55.

In step S55, the returning of the contact of the PTC-mounted thermostat 62 is detected by the detection circuit 66. For example, the detection circuit 66 detects the returning of the contact by detecting the variation in a voltage of both ends of the PTC-mounted thermostat 62. When detecting the returning of the contact, the detection circuit 66 stops the output of the open signal of the high level. For example, the detection circuit 66 newly changes the signal level from high to low, and outputs the open signal of the low level. Then, the process proceeds to step S56 and step S57.

The open signal of the low level, which is output from the detection circuit 66, is received by the microcomputer 68. Even in the case of receiving the open signal of the low level, the microcomputer 68 does not output the trigger pulse with respect to the latch circuit 72 and the latch circuit 73. Therefore, the latch circuit 72 and the latch circuit 73 continuously output the signal of the low level. In step S56, a state in which the trigger switch 52 is turned off (operation prohibition state) is maintained. In step S57, a state in which the discharge control FET 64 is turned off (discharge prohibition state) is maintained. Then, the process proceeds to step S58.

In step S58, it is determined whether or not a maintenance release condition is established. The maintenance release condition is, for example, a state in which a load is opened, and specifically, a state in which the battery pack 8 is detached from the electric screwdriver 51. The microcomputer 68 detects the detachment of the battery pack 8 from the electric screwdriver 51 by an electrical or physical detection mechanism. In a case where the maintenance release condition is not established, that is, in a case where the battery pack 8 is not detached from the electric screwdriver 51, the process returns to step S56 and step S57. In a case where the maintenance release condition is established, that is, in a case where the battery pack 8 is detached from the electric screwdriver 51, the process proceeds to step S59.

In step S59, a process of operating the latch circuit 72 and the latch circuit 73 is performed. The microcomputer 68 outputs a trigger pulse with respect to the latch circuit 72 and the latch circuit 73. Then, the process proceeds to step S60, step S61, and step S62.

In step S60, the trigger pulse, which is output from the microcomputer 68, is supplied to the latch circuit 73. The latch circuit 73 changes the level of the output signal from low to high according to the supplied trigger pulse, and outputs the signal of the high level.

In step S61, the trigger pulse, which is output from the microcomputer 68, is supplied to the latch circuit 72. The latch circuit 72 changes the level of the output signal from low to high according to the supplied trigger pulse, and output the signal of the high level. The signal of the high level, which is output from the latch circuit 72, is supplied to the discharge control FET 64. The discharge control FET 64 is turned on by the supplied signal of the high level. In addition, in step S61, the LED may be turned off as described in the sixth or seventh embodiment. Then, the process proceeds to step S63.

In step S63, the battery pack 8 becomes a dischargeable state. After the battery pack 8 becomes the dischargeable state, a control to make the latch circuit 72 and the latch circuit 73 open may be performed by the microcomputer 68. Then, the process proceeds to step S41.

Figure 15:
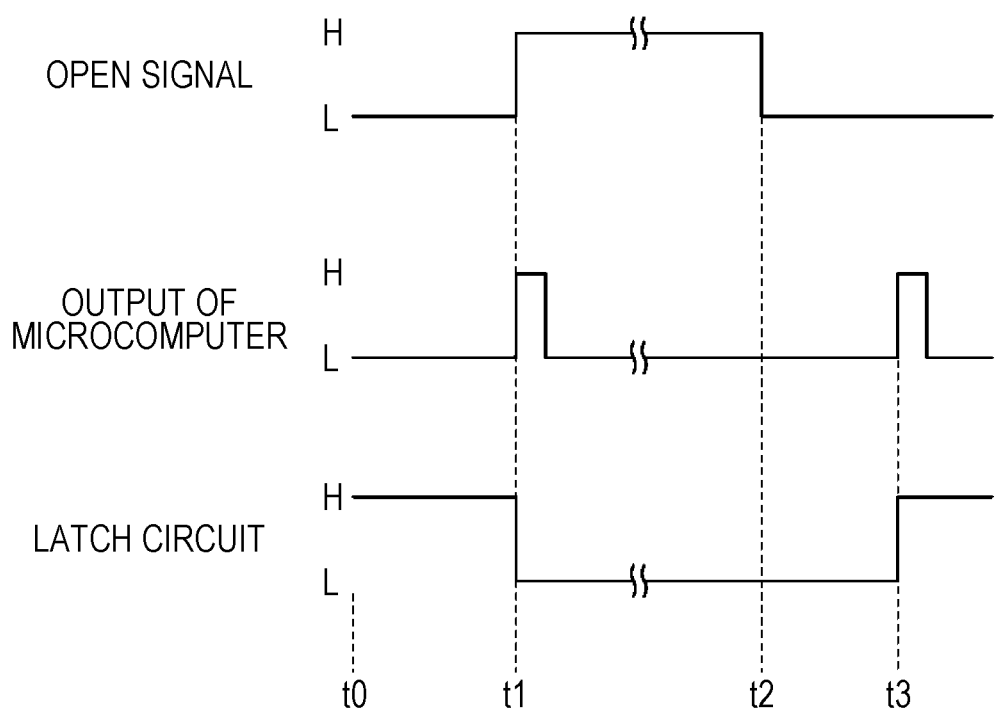
FIG. 15 is a time chart illustrating an operation of the battery pack according to the eighth embodiment of the present disclosure.

FIG. 15 shows a time chart of an operation in the battery pack 8. A range between time t0 to time t1 is a period in which the battery pack 8 is dischargeable. In this period, the discharge control FET 64 is turned on by, for example, a control of the control IC 65. The trigger switch 52 is controlled to a state in which an operation of a user is effective. For example, the latch circuit 72 and the latch circuit 73 are made to be opened. Therefore, the signal output from the latch circuit 72 is not supplied to the discharge control FET 64. The signal output from the latch circuit 73 is not supplied to the trigger switch 52.

At a timing of the time t1, the contacts of the PTC-mounted thermostat 62 are opened due to the overcurrent, and the open signal of the high level is output from the detection circuit 66. The open signal of the high level, which is output from the detection circuit 66, is supplied to the microcomputer 68. The microcomputer 68 output the trigger pulse to the latch circuit 72 and the latch circuit 73.

The latch circuit 72 and the latch circuit 73 operate by the trigger pulse supplied from the microcomputer 68. The latch circuit 72 and the latch circuit 73 output the signal of the low level. The discharge control FET 64 is turned off by the signal of the low level supplied from the latch circuit 72. The trigger switch 52 is forcibly turned off by the signal of the low level supplied from the latch circuit 73. The battery pack 8 becomes the discharge prohibition state due to the turning off of the discharge control FET 64. The operation of the electric screwdriver 51 is prohibited due to the turning off of the trigger switch 52. The electric screwdriver 51 becomes an operation prohibition state.

At a timing of a time t2, the contact of the PTC-mounted thermostat 62 returns. When detecting the returning of the contact of the PTC-mounted thermostat 62, the detection circuit 66 supplies the open signal of the low level to the microcomputer 68. Even when the open signal of the low level is supplied from the detection circuit 66, the microcomputer 68 does not output the trigger pulse with respect to the latch circuit 72 and the latch circuit 73. That is, the discharge prohibition state and the operation prohibition state are maintained.

At a timing of a time t3, for example, the battery pack 8 is detached from the electric screwdriver 51. The detachment of the battery pack 8 from the electric screwdriver 51 is detected by the microcomputer 68. Then, the microcomputer 68 outputs the trigger pulse to the latch circuit 72 and the latch circuit 73.

The latch circuit 72 and the latch circuit 73 newly change the level of the signal from low to high according to the trigger pulse supplied from the microcomputer 68. When the signal of the high level is output from the latch circuit 72, the discharge control FET 64 is turned on. After the time t3, the battery pack 8 becomes a dischargeable state. In addition, when the battery pack 8 is detached from the electric screwdriver 51, the supply of the signal of the low level from the latch circuit 73 to the trigger switch 52 is stopped. Therefore, the state in which the trigger switch 52 is forcibly turned off is released. In a case where the battery pack 8 is mounted again in the electric screwdriver 51, the electric screwdriver 51 operates by electric power supplied from the battery pack 8.

In the eighth embodiment, even when the PTC-mounted thermostat 62 is reset, the discharge control FET 64 is not turned on, the discharge prohibition state is maintained. Therefore, the electric tool does not start to operate suddenly by the returning of the contact of the PTC-mounted thermostat 62. For example, it is possible to prevent the electric tool from suddenly operating while a user confirms a state of the electric tool that is stopped at once due to the overcurrent. Furthermore, it is not necessary to prohibit the discharge in a case where an apparatus operates by the battery pack is not present, like a case in which the battery pack is detached from the electric tool. In such a state, the battery pack may again become a dischargeable state.

In addition, as described above, even when the PTC-mounted thermostat 62 is reset, the trigger switch 52 may not be turned on, and the operation prohibition state of the electric screwdriver 51 may be maintained. When the trigger switch 52 is not turned on, it is possible to prevent the electric tool from suddenly operating as described above.

In addition, the maintenance release condition is not limited to the opening of the load. For example, the connection of the battery pack 8 to the charging device may be a condition. That is, in a case where the microcomputer 68 detects the connection of the battery pack 8 to the charging device, the discharge control FET 64 may be turned on. When the discharge control FET 64 is turned on, the battery pack 8 becomes a dischargeable state. Whether or not the battery pack 8 is connected to the charging device may be determined by, for example, an initiation of an authentication communication between the battery pack 8 and the charging device by using the communication terminal 74.

In addition, only any one of the latch circuit 72 and the latch circuit 73 may be provided. For example, only the latch circuit 72 may be provided, and the control state with respect to the discharge control FET 64 may be maintained. A function of the latch circuit 72 or the latch circuit 73 may be incorporated in the microcomputer 68.

Ninth Embodiment

FIG. 16 shows a configuration example of the battery pack 9 according to a ninth embodiment. In addition, in the battery pack 9, like reference numerals will be given to like parts having substantially the same functions, and redundant description thereof will be appropriately omitted.

In the battery pack 9, a serial connection of a resistor 81 and a FET 82 and a serial connection of a resistor 83 and a FET 84 are inserted between an output terminal of the regulator 69 and a terminal GND. On and off of the FET 82 and FET 84 is controlled by the control IC 65. The FET 82 and FET 84 are, for example, N-channel FETs. The FET 82 is turned on by an overcharge detection signal that is output from the control IC 65. The FET 84 is turned is turned on by an overdischarge detection signal that is output from the control IC 65. In a common state, the microcomputer 68 operates at a sleep state for reduction of power-consumption, and when receiving a signal from the control IC 65, transitions to a common operation state from the sleep state.

A port of the microcomputer 68, which is pulled up, is changed to high or low according to on and off of the FET 82 and FET 84. Therefore, the microcomputer 68 can recognize an overcharge state or an overdischarge state. For example, in the case of the overcharge, the microcomputer 68 transmits an abnormal charge signal to a charging device through the communication terminal 74. When receiving the abnormal charge signal, the charging device stops a charging operation.

An operation example of the battery pack 9 will be described with reference to a flow chart shown in FIG. 17. In step S71, a discharge current flows to a current path of the battery pack 9. In a dischargeable state, the contacts of the PTC-mounted thermostat 62 come into contact with each other. The detection circuit 66 supplies an open signal indicating that the contacts of the PTC-mounted thermostat 62 come into contact with each other to the microcomputer 68. For example, the detection circuit 66 supplies the open signal of a low level to the microcomputer 68. Then, the process proceeds to step S72. In step S72, the PTC-mounted thermostat 62 generates heat due to the discharge current. Then, the process proceeds to step S73.

In step S73, it is determined whether or not the contacts of the PTC-mounted thermostat 62 are opened. That is, it is determined whether or not the contacts of the PTC-mounted thermostat 62 are opened due to flowing of the overcurrent to a current path of the battery pack 9 and an increase of the heat generation in the PTC-mounted thermostat 62. In a case where the contacts are not opened, the process returns to step S71. In a case where the contacts are opened, the process proceeds to step S74.

In step S74, the opening of the contacts of the PTC-mounted thermostat 62 is detected by the detection circuit 66. For example, the detection circuit 66 detects the opening of the contacts by detecting variation of a voltage at both ends of the PTC-mounted thermostat 62. Then, the process proceeds to step S75.

In step S75, the detection circuit 66 supplies the open signal indicating the opening of the contacts to the microcomputer 68. For example, the detection circuit 66 supplies the open signal of a high level to the microcomputer 68 by newly changing the signal level from low to high. The detection circuit 66 supplies the open signal of the high level to the microcomputer 68 while the contacts of the PTC-mounted thermostat 62 are opened. Then, the process proceeds to step S76.

In step S76, the open signal of the high level, which is output from the detection circuit 66, is received by the microcomputer 68. Then, the process proceeds to step S77. In step S77, the microcomputer 68 that receives the open signal of the high level generates a trigger switch turning-off signal to turn off the trigger switch 52. The microcomputer 68 outputs the generated trigger switch turning-off signal. Then, the process proceeds to step S78.

In step S78, the trigger switch turning-off signal, which is output from the microcomputer 68, is supplied to the electric screwdriver 51 through the control terminal 67. The trigger switch 52 of the electric screwdriver 51 is turned off by the trigger switch turning-off signal. Then, the process proceeds to step S79.

In step S79, it is determined whether or not the contacts of the PTC-mounted thermostat 62 again come into contact with each other, that is, whether or not one of the contacts returns. In a case where the contact of the PTC-mounted thermostat 62 does not return, the process returns to step S75, and the detection circuit 66 continuously outputs the open signal of the high level. When the PTC-mounted thermostat 62 is cooled down and thereby the contact of the PTC-mounted thermostat 62 returns, the process proceeds to step S80.

In step S80, the returning of the contact of the PTC-mounted thermostat 62 is detected by the detection circuit 66. For example, the detection circuit 66 detects the returning of the contact by detecting the variation in a voltage of both ends of the PTC-mounted thermostat 62. When detecting the returning of the contact, the detection circuit 66 stops the output of the open signal of the high level. For example, the detection circuit 66 newly changes the signal level from high to low, and outputs the open signal of the low level. Then, the process proceeds to step S81.

In step S81, the open signal of the low level, which is output from the detection circuit 66, is received by the microcomputer 68. The microcomputer 68, which receives the open signal of the low level, stops the output of the trigger switch turning-off signal. Then, the process proceeds to step S82, and it becomes a state in which the operation of the trigger switch 52 is possible. Then, the process proceeds to step S83, and it becomes a state in which the battery pack 9 is dischargeable. Then, the process returns to step S71. In this manner, the present disclosure is applicable with respect to a battery pack not including an element such as a FET that controls the charge and discharge.

Application

In the above-described embodiments, description has been given in a manner such that the battery pack is used in the electric tool, but it is not limited to this. Hereinafter, an application will be described.

Electricity Storage System in House as Application

An example in which the present disclosure is applied to an electricity storage system for a house will be described with reference to FIG. 18. For example, in regard to an electricity storage system 100 for a house 101, electric power is supplied to an electricity storage device 103 from a centralized power system 102 such as a thermal power generation 102*a*, a nuclear power generation 102*b*, a hydraulic generation 102*c* through a power network 109, an information network 112, a smart meter 107, a power hub 108, or the like. In addition, electric power from an independent power supply such as an in-house power generator 104 is supplied to the electricity storage device 103. The electric power supplied to the electricity storage device 103 is stored. Electric power that is used in the house 101 is supplied by using the electricity storage device 103. The same electricity storage system may also be used with respect to a building without being limited to the house 101.

The power generator 104, power-consuming devices 105, the electricity storage device 103, a control device 110 that controls various devices, the smart meter 107, and sensors 111 that acquire various pieces of information are provided in the house 101. Each of the devices is connected to the power network 109 and the information network 112. As the power generator 104, a solar cell, a fuel cell, a windmill, or the like is used, and generated power is supplied to the power-consuming devices 105 and/or the electricity storage device 103. As the power-consuming devices 105, a refrigerator 105*a*, an air conditioner 105*b*, a television receiver 105*c*, a bath 105*d*, or the like may be exemplified. In addition, as the power-consuming device 105, an electrically driven vehicle 106 is exemplified. As the electrically driven vehicle 106, an electric vehicle 106*a*, a hybrid car 106*b*, and an electric bike 106*c* are exemplified. The electrically driven vehicle 106 may be an electric motor-assisted bicycle or the like.

The electricity storage device 103 is configured by, for example, a secondary battery or a capacitor. For example, the electricity storage device 103 is configured by a lithium ion battery. The lithium ion battery may be a stationary type, or may be used in the electrically driven vehicle 106. The battery pack according to the above-described embodiments of the present disclosure may be applied with respect to this electricity storage device 103. The smart meter 107 has a function of measuring a used amount of a commercial power and of transmitting this measured used amount to a power company. The power network 109 may be any one of a DC power supply type, an AC power supply type, and non-contact power supply type, or a combination thereof.

The various sensors 111 includes, for example, a motion sensing sensor, a luminance sensor, an object sensing sensor, a power-consumption sensor, a vibration sensor, a contact sensor, a temperature sensor, an infrared sensor, or the like. Information acquired by the various sensors 111 is transmitted to the control device 110. Weather conditions, conditions of human, or the like is grasped by the information transmitted from the sensors 111, and the power-consuming devices 105 are automatically controlled, such that it is possible to make the power-consumption minimal. In addition, the control device 110 may transmit information related to the house 101 to an external power company or the like through the Internet.

Processes such as divergence of power lines and DC-AC conversion are performed by the power hub 108. As a communication method of the information network 112 connected to the control device 110, a method using a communication interface such as a UART (Universal Asynchronous Receiver Transmitter: transmission and reception circuit for asynchronous serial communication), and a method using a sensor network compliant to a wireless communication standard such as a Bluetooth, a ZigBee, and a Wi-Fi may be exemplified. The Bluetooth method is applied to multimedia communication and can perform one-to-multi-connection communication. The ZigBee uses a physical layer of IEEE (Institute of Electrical and Electronics Engineers) 802.15.4. The IEEE 802.15.4 is a name of a short-range wireless network standard called PAN (Personal Area Network) or W (Wireless) PAN.

The control device 110 is connected to an external server 113. The server 113 may be controlled by any one of the house 101, the power company and a service provider. As information that is transmitted to and received from the server 113, for example, power-consumption information, life pattern information, power rates, weather information, disaster information, and information related to power transaction may be exemplified. These kinds of information may be transmitted to and received from in-house power-consuming devices (for example, television receivers), but may be transmitted to and received from devices (for example, cellular phones, or the like) positioned at the outside of the house. These kinds of information may be displayed on, for example, a television receiver, cellular phones, PDA (Personal Digital Assistants), or the like, which has a display function.

The control device 110 that controls each unit includes a CPU (Central Processing Unit), a RAM (Random Access Memory), a ROM (Read Only Memory), or the like, and is accommodated in the electricity storage device 103 in this example. The control device 110 is connected to the electricity storage device 103, the in-house power generator 104, the power-consuming devices 105, the various sensors 111, and the server 113 through the information network 112, and has, for example, a function of adjusting the used amount of commercial power and an amount of generation. Furthermore, in addition to this function, the control device 110 may have a function of performing power transaction in a power market, or the like.

As described above, a generated output of the in-house power generator 104 (photovoltaic generation and wind power generation) as well as the centralized power system 102 such as the thermal generation 102a, the nuclear power generation 102b, and the hydraulic power generation 102c may be stored in the electricity storage device 103. Therefore, even when the generated output of the in-house power generator 104 varies, it is possible to make an amount of power that is transmitted to the outside uniform, or it is possible to control discharge as much as necessary. For example, a method of use described below may be considered. Specifically, the electric power that is obtained from the photovoltaic generation is stored in the electricity storage device 103, and inexpensive midnight power is also stored in the electricity storage device 103 at night, and then the electric power that is stored in the electricity storage device 103 is discharged to be used in a period of time at which a rate is expensive in the day time.

In the above-described application, an example in which the control device 110 is accommodated in the electricity storage device 103 is described, but the control device 110 may be accommodated in the smart meter 107, or may be configured alone. Furthermore, the electricity storage system 100 may be used in a plurality of homes as targets in regard to an apartment house, or may be used in a plurality of detached houses as targets.

Electricity Storage System in Vehicle as Application

An example in which the present disclosure is applied to an electricity storage system for a vehicle will be described with reference to FIG. 19. FIG. 19 schematically illustrates a configuration example of a hybrid car that adopts a series hybrid system to which the present disclosure is applied. The series hybrid system is a vehicle that travels with a driving force converting device by using electric power generated by a generator moved by an engine or the electric power that is temporarily stored in a battery.

In the hybrid car 200, an engine 201, a generator 202, a power-driving force converting device 203, a driving wheel 204a, a driving wheel 204b, a wheel 205a, a wheel 205b, a battery 208, a vehicle control device 209, various sensors 210, a charging inlet 211 are mounted. As the battery 208, the battery pack according to the above-described embodiments of the present disclosure is applied.

The hybrid car 200 travels using the power-driving force converting device 203 as a power source. An example of the power-driving force converting device 203 is a motor. The power-driving force converting device 203 operates by electric power of the battery 208 and a torque of the power-driving force converting device 203 is transferred to the driving wheels 204a and 204b. In addition, the power-driving force converting device 203 may be applicable to an AC motor or a DC motor by using a DC-AC conversion or an invert conversion (AC-DC conversion) as necessary. The various sensors 210 controls a rotation number of an engine or an opening degree of a throttle valve (not shown) (throttle opening degree) through the vehicle control device 209. The various sensors 210 include a speed sensor, an acceleration sensor, a sensor of a rotation number of an engine, or the like.

A torque of the engine 201 may be transferred to the generator 202, and electric power generated by the generator 202 using the torque may be stored in the battery 208.

When the hybrid car is decelerated by a brake mechanism (not shown), resistance power at the time of the deceleration is added to the power-driving force converting device 203 as a torque, and regenerated electric power that is generated by the power-driving force converting device 203 due to the torque is stored in the battery 208.

When the battery 208 is connected to an external power supply outside the hybrid car, electric power may be supplied to the battery 208 from the external power supply by using the charging inlet 211 as an input inlet and may store the supplied electric power.

Although not shown, an information processing device that performs an information processing related to a vehicle control on the basis of information related to the secondary battery may be provided. As this information processing device, for example, an information processing device that performs a display of a residual amount of a battery on the basis of information about the residual amount of the battery, or the like may be exemplified.

In addition, hereinbefore, description is made by using, as an example, the series hybrid car that travels with a motor by using electric power generated by a generator moved by an engine or the electric power that is temporarily stored in a battery. However, the present disclosure may be effectively applied to a parallel hybrid car that uses all of the output of the engine and the output of the motor are used as a driving source, and utilizes three types of traveling by only the engine, traveling by only the motor, and traveling by the engine and motor by appropriately changing these types. In addition, the present disclosure may be effectively applied with respect to a so-called electrically driven vehicle that travels with driving by only a driving motor without using the engine.

Modification

Various modifications may be made to the present disclosure without being limited to the above-described embodiments. For example, in the above-described second embodiment, for example, the overcurrent is generated in a state in which the trigger switch 52 is pushed by the user, and the PTC-mounted thermostat 62 operates. The detection circuit 66 detects the operation of the PTC-mounted thermostat 62, and outputs the open signal. Due to the open signal, the trigger switch 52 is forcibly turned off.

When the PTC-mounted thermostat 62 is cooled down and thereby the contact returns, the output of the open signal is stopped. When the output of the open signal is stopped, the operation of the trigger switch 52 becomes effective. At this time, the state in which the trigger switch 52 is pushed continues, the motor 53 operates. When the motor 53 operates, the electric screwdriver 51 operates suddenly, such that this is not preferable. Therefore, in a case where the state in which the trigger switch 52 is pushed continues, when the PTC-mounted thermostat 62 is reset, the motor 53 may not operate.

For example, it may determine whether or not the trigger switch 52 returns after the PTC-mounted thermostat 62 is reset. In a case where the trigger switch 52 returns at once, and the trigger switch 52 is pushed again, a control to operate the motor 53 may be performed in the electric screwdriver 51. This control may be performed by, for example, the third embodiment or the fifth embodiment.

The present disclosure is applicable to, for example, a secondary battery other than a lithium ion battery. In addition, the present disclosure is applicable to an apparatus in which the PTC-mounted thermostat is used. In addition, the technology of the present disclosure is applicable to a different self-reset type element.

The present disclosure may be realized by a control method or a control system. The respective technical matters in the plurality of embodiments may be combined within a range without technical contradiction. In addition, optional configurations in the content of the present disclosure may be appropriately added or omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a current control element which is inserted in a discharge current path of a battery cell, and in which a thermostat and a heat sensitive resistance element whose resistance value increases in response to an increase in temperature are connected in parallel;
a detection unit configured to detect a voltage variation across the thermostat and output a first open signal of a first predetermined level indicating the opening of the contacts when it is detected that contacts of the thermostat are opened, and a second open signal of a second predetermined level in response to the opened contacts coming into contact with each other;
a control unit that outputs a control signal to realize a discharge prohibition state when the first open signal is supplied, and controls an external apparatus connected to the battery pack to be an operation prohibition state; and
a maintaining unit including a first latch circuit and a second latch circuit,
wherein in a case where the opened contacts return, both the first and second latch circuits continuously outputs a respective control signal so as to maintain the discharge prohibition state and the operation prohibition state, respectively.

2. The battery pack according to claim 1, wherein a discharge control switching element is turned off according to the open signal.

3. The battery pack according to claim 1, further comprising:
a terminal that is connected to the external apparatus,
wherein the open signal is output to the external apparatus through the terminal to turn off a switching element of the external apparatus.

4. The battery pack according to claim 1, further comprising
a terminal that is connected to the external apparatus,
wherein the control signal of the second latch circuit turns off a switching element of the external apparatus to the external apparatus through the terminal.

5. The battery pack according to claim 1, wherein when a predetermined state is reached after the contact returns, the control unit controls the maintaining unit to release the discharge prohibition state.

6. The battery pack according to claim 5, wherein the predetermined state is a state in which a load is opened, or a state in which a connection with a charger is performed.

7. The battery pack according to claim 1, further comprising:
a light emitting unit,
wherein light emission of the light emitting unit is controlled according to a state of the open signal.

8. The battery pack according to claim 1, wherein the battery pack is connected to an external apparatus including a light emitting unit, and light emission of the light emitting unit is controlled according to the first and second open signals.

9. An electricity storage system,
wherein the battery pack according to claim 1 is charged by a power generator that generates electricity from renewable energy.

10. An electricity storage system, comprising:
the battery pack according to claim 1,
wherein electric power is supplied to an electronic apparatus connected to the battery pack.

11. An electronic apparatus,
wherein electric power is supplied from the battery pack according to claim 1.

12. An electrically driven vehicle, comprising:
a converting device to which electric power is supplied from the battery pack according to claim 1, and which converts the electric power to a driving force of a vehicle; and
a control device that performs an information processing related to a vehicle control based on information related to the battery pack.

13. An electric power system, comprising:
an electric power information transmitting and receiving unit that transmits and receives signals to and from another apparatus through a network,
wherein a charging and discharging control of the battery pack according to claim 1 is performed based on the information which the electric power information transmitting and receiving unit receives.

14. An electric power system,
wherein electric power is supplied from the battery pack according to claim 1, or electric power is supplied to the battery pack from a power generator, or an electric power network.

15. A control system including an external apparatus and a battery pack that is mounted in the external apparatus, the battery pack comprising:
a current control element which is inserted in a discharge current path of a battery cell, and in which a thermostat and a heat sensitive resistance element whose resistance value increases in response to an increase in temperature are connected in parallel,
a terminal that is connected to the external apparatus, and
a detection unit configured to detect a voltage variation across the thermostat and output a first open signal of a first predetermined level indicating the opening of the contacts through the terminal when it is detected that contacts of the thermostat are opened, and a second open signal of a second predetermined level in response to the opened contacts coming into contact with each other,
a control unit that outputs a control signal to realize a discharge prohibition state when the first open signal is supplied, and to control the external apparatus to be an operation prohibition state;
a maintaining unit including a first latch circuit and a second latch circuit;
wherein the external apparatus includes a switching element that is turned off according to the first open signal, and wherein in a case where the opened contacts return, both the first and second latch circuits continuously output a respective control signal so as to maintain the discharge prohibition state and the operation prohibition state, respectively.

16. A control system including an external apparatus and a battery pack that is mounted in the external apparatus, the battery pack comprising:

a current control element which is inserted in a discharge current path of a battery cell, and in which a thermostat and a heat sensitive resistance element whose resistance value increases in response to an increase in temperature are connected in parallel, a detection unit configured to detect a voltage variation across the thermostat and output a first open signal of a first predetermined level indicating the opening of the contacts when it is detected that contacts of the thermostat are opened, and a second open signal of a second predetermined level in response to the opened contacts coming into contact with each other, a control unit that outputs a control signal for realizing a discharge prohibition state when the first open signal is supplied, and controls the external apparatus to be an operation prohibition state, and a maintaining unit including a first latch circuit and a second latch circuit, wherein in a case where the opened contacts return, both the first and second latch circuits continuously output a respective control signal so as to maintain the discharge prohibition state and the operation prohibition state, respectively.

\* \* \* \* \*